United States Patent [19]

Tsubo

[11] Patent Number: 4,602,868

[45] Date of Patent: Jul. 29, 1986

[54] METHOD OF FORMING IMAGES

[75] Inventor: Shuzo Tsubo, Kawasaki, Japan

[73] Assignee: Kabushiki Kaisha Toshiba, Kawasaki, Japan

[21] Appl. No.: 670,020

[22] Filed: Nov. 9, 1984

[30] Foreign Application Priority Data

Nov. 11, 1983 [JP] Japan ................................ 58-210741

[51] Int. Cl.[4] ................................................ G03B 27/32

[52] U.S. Cl. .......................................... 355/77; 355/26

[58] Field of Search .................................... 355/26, 77

[56] References Cited

U.S. PATENT DOCUMENTS 4,098,551 11/1978 Komori et al. .

4,218,128 2/1980 Satomi et al. .

4,362,379 12/1982 Tiek et al. ............................. 355/77

4,501,490 2/1985 Miyamoto et al. ................... 355/55

FOREIGN PATENT DOCUMENTS 1546278 7/1979 United Kingdom .

*Primary Examiner*—Monroe H. Hayes

*Attorney, Agent, or Firm*—Cushman, Darby & Cushman

[57] ABSTRACT

In a method of forming images on respective upper and lower surfaces of a copy sheet in accordance with a page order of an odd number of documents, the documents are sequentially fed from the final page two at a time, and every other image is sequentially formed on the sheets. Subsequently, the documents are fed again from the final page, a noncopied sheet is fed to form the final image on one surface before the every other images are formed on the sheets each having an image on one surface. Finally, the images are formed on the other surfaces of the sheets each having the image on one surface in an order of a count-down sequence of the pages.

11 Claims, 65 Drawing Figures

FIG. 10
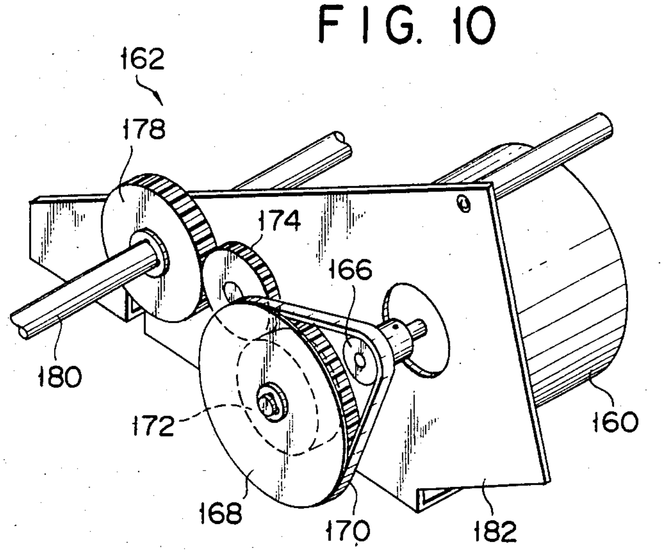
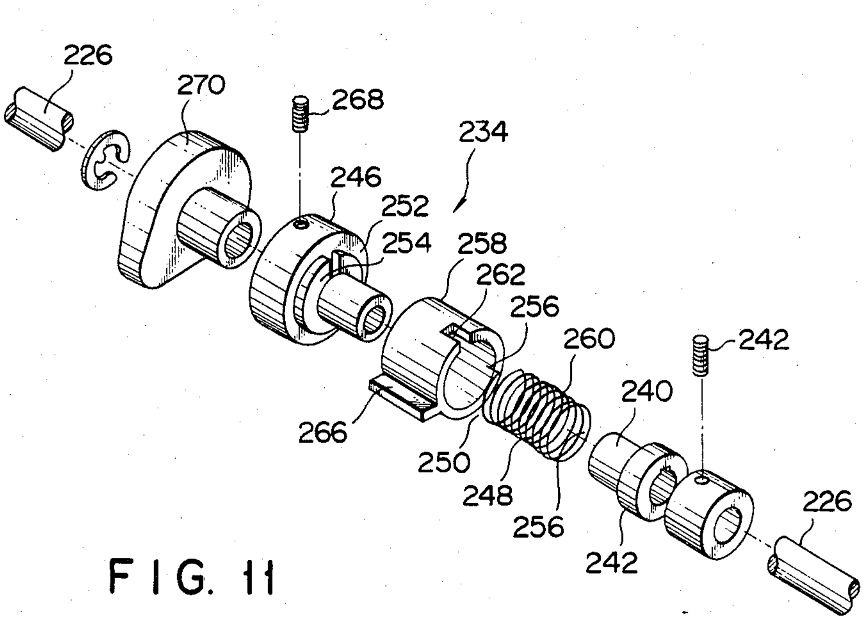
FIG. 11

METHOD OF FORMING IMAGES

BACKGROUND OF THE INVENTION

The present invention relates to a method of forming images on two surfaces of a sheet in accordance with a page order of documents and, more particularly, to a method for respectively forming images on the two surfaces of a sheet when an odd number of documents is prepared.

In general, two-side image formation is well known when images of a plurality of documents are formed on two surfaces of sheets. In a conventional image formation method of this type, a problem exists when images are formed on sheets in the order reverse to a page order and the number of documens is an odd number. In this case the upper surface of the first sheet is kept blank, so a continuous page order of the resultant images cannot be obtained, resulting in inconvenience. In the conventional image formation method, as shown in FIGS. 1 and 2, first, an odd number of stacked documents P1 to P7 are fed one by one, and even-numbered documents P6, P4 and P2 are sequentially processed by an image forming apparatus B. In this case, each document image is formed on one surface of each of the sheets Q sequentially fed. Second, the documents P1 to P7 are fed in the order named. Odd-numbered documents are sequentially processed, and each image is formed on the other surface of each of the sheets Q, thereby completing two-side image formation. An image P1' corresponding to the document P1 is formed on lower surface of the uppermost sheet. Referring to FIGS. 1 and 2, reference symbols P1', P2', P3', . . . and P7' denote images corresponding to the documents P1, P2, P3, . . . and P7, respectively.

SUMMARY OF THE INVENTION

It is an object of the present invention to obtain sheets having images in a continuous page order in accordance with a page order of documents when an odd number of images are formed on two surfaces of the sheets.

According to an aspect of the present invention, there is provided a method of forming images of respective documents on two surfaces of sheets in accordance with a page order of an odd number of documents by using image forming apparatus having an image forming means for forming the images in accordance with image patterns of the documents scanned at a scanning position. In the method, a first document feeding step repeatedly feeds two of the documents in reverse page order to the scanning position. This feeding step leaves two documents located at the scanning position. In a first scanning step, every second page beginning with the second page of the document is scanned so that alternate pages of this document are scanned. A first sheet feeding step sequentially feeds a plurality of sheets to the image forming means and in an image forming step the document images from the first scanning step are formed on the sheets fed. These sheets with images formed on one side are then stacked, and used to form images on the other side thereof. The original documents are also restacked and again fed to the scanning position where every second document from the final page is scanned and printed on the reverse side of the sheets used in the first sheet feeding step.

BRIEF DESCRIPTION OF THE DRAWINGS

FIG. 10 is a perspective view showing an assembly of the first power transmitting section in FIG. 9;

FIG. 11 is an exploded perspective view of a clutch shown in FIG. 8;

DETAILED DESCRIPTION OF THE PREFERRED EMBODIMENTS

Embodiments of the present invention will be described in detail with reference to FIGS. 3 to 65.

Figure 1:
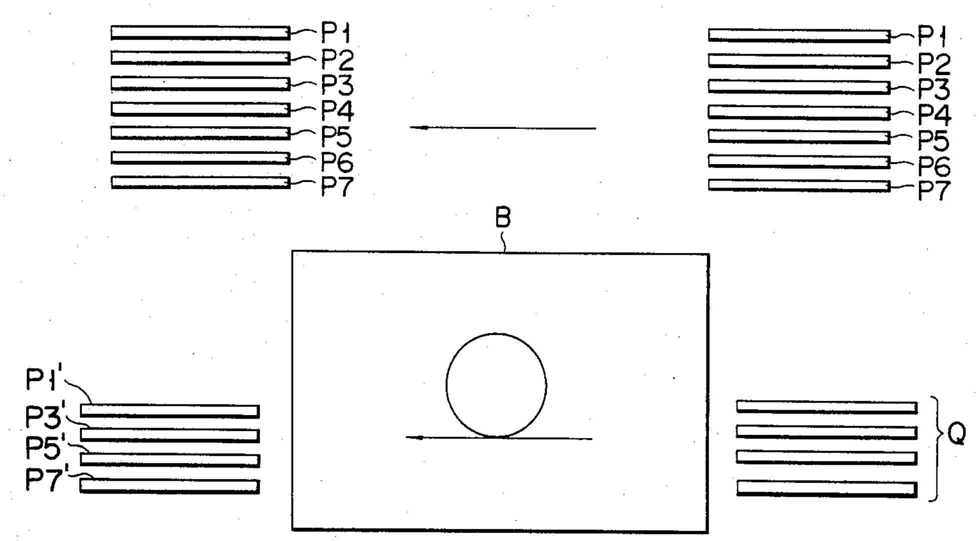
FIG. 1 PRIOR ART
FIGS. 1 and 2 are respectively representations for explaining a conventional method of forming an image.
Figure 2:
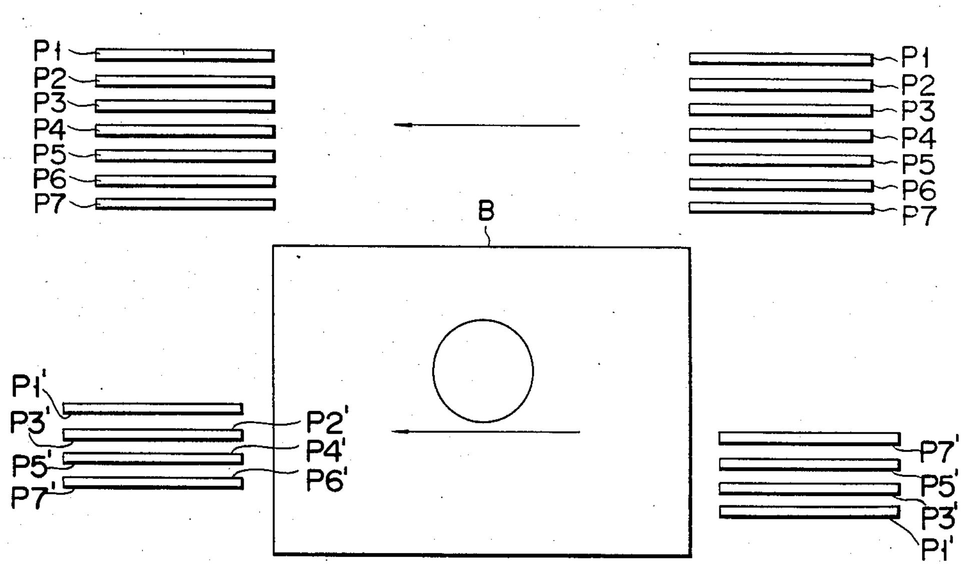
FIG. 2 PRIOR ART
Figure 3:
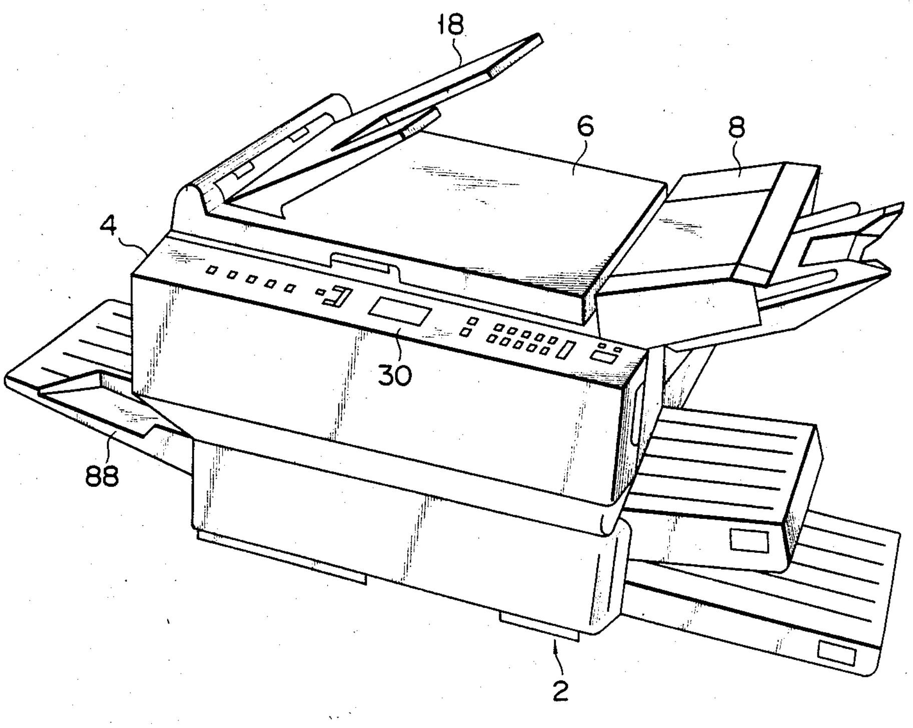
FIGS. 3 and 4 are respectively perspective views schematically showing an automatic two-side copying machine according to an embodiment of the present invention.
Figure 4:
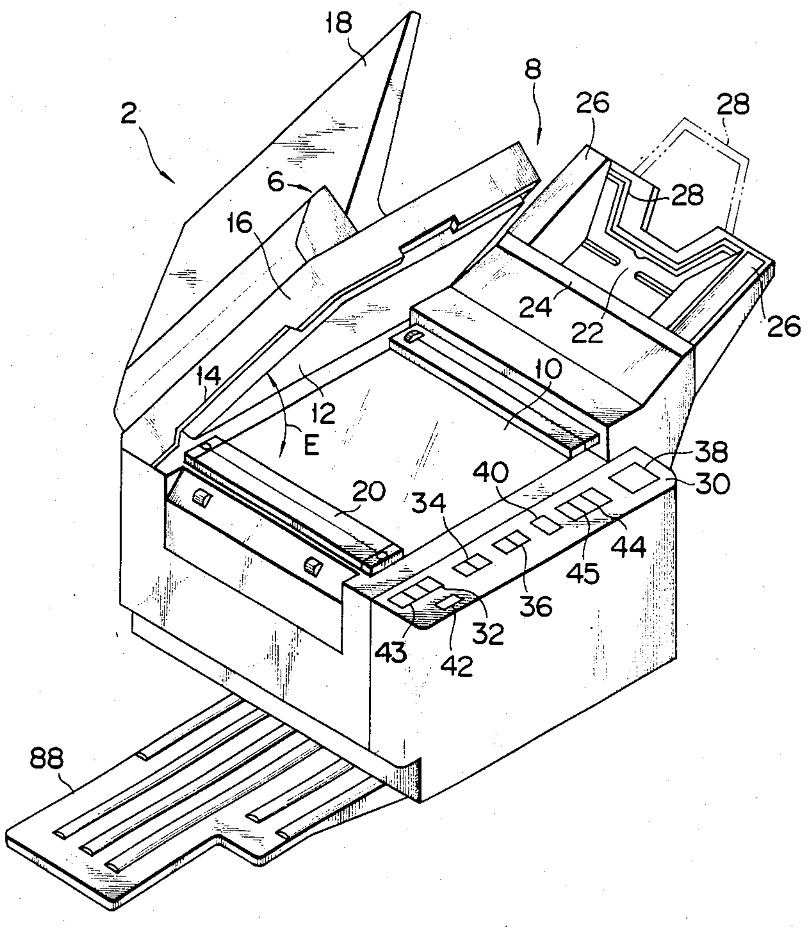

As shown in FIGS. 3 and 4, original documents to be copied are stacked on an upper portion of a copying machine body 4 of an automatic two-side copying machine 2. These documents are sequentially fed by a document feeding unit 8 commencing from the uppermost document. The document feeding unit 8 feeds the documents one by one to a conveyor belt unit 6 (to be described later). An exposing table (document table) 10 is arranged at the upper portion of the body 4. The exposing table 10 is made of a transparent material so as to expose a document to be copied. The conveyor belt unit 6 is arranged on the exposing table 10 to be manually opened/closed in the direction (indicated by arrow E) by an operator at the time of exposure.

A conveyor belt 12 for feeding a document fed from the document feeding unit 8, a discharging roller 14 (FIG. 5) for discharging the document, and a cover 16 are arranged in the conveyor belt unit 6. A document tray 18 is disposed on the exposing table 10 at a side opposing the document feeding unit 8 so as to receive the documents fed by the conveyor belt unit 6. A document stopping member 20 is pivotally disposed on the exposing table 10. The document stopping member 20 abuts against the leading edge of the document to set the document fed by the conveyor belt 12 at a predetermined exposure position.

A document table 22 for stacking a plurality of documents is disposed in the document feeding unit 8 and is inclined with respect to the exposing table 10. A document chamber 24 is formed on the document table 22 at a front side along the document convey direction so as to store the leading edges of the documents placed on the document table 22. Guide plates 26 are disposed at two sides of the document table 22 along the document convey direction so as to guide the document. These guide plates 26 can be slid in a direction perpendicular to the document convey direction. An auxiliary document table member 28 is pivotally mounted on the document table 22 at a side opposite to the chamber 24. The auxiliary document table member 28 is mounted on the document table 22 and can be pivoted through about 150 degrees with respect to the document table 22. An operation panel 30 is arranged at the upper portion of the body 4. The operation panel 30 has a magnification button 32, a copy mode selection button 34, a paper selection button 36, a start button 38, an odd number input button 40 for designating that the number of documents is an odd number, a blank portion setting means 42 for setting a margin size when the margin is to be formed on the copy sheet, and a document feed mode selection button 44 for setting a feed mode of the document. Inputs from these buttons are supplied to a control unit (not shown) and are used for various types of control (to be described later) for the automatic two-side copying machine.

Figure 5:
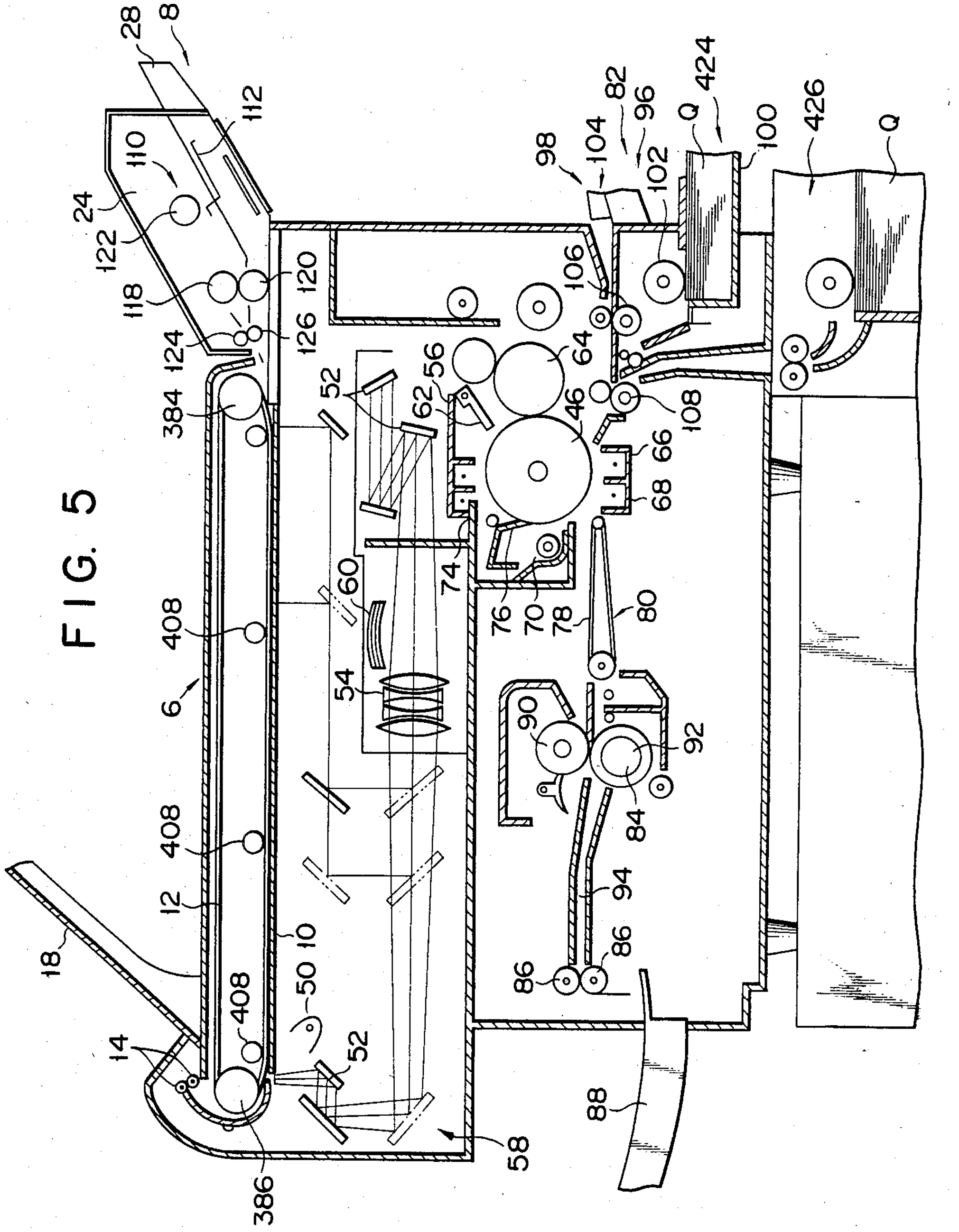
FIG. 5 is a sectional view schematically showing the automatic two-side copying machine shown in FIG. 4.

As shown in FIG. 5, a photosensitive drum 46 is rotatably mounted in the body 4. An exposing unit (scanning unit) 58 is arranged between the photosensitive drum 46 and the document feeding unit 6. The exposing unit 58 comprises a lamp 50, a mirror 52, a lens 54, a slit 56 and so on and is moved in synchronism with rotation of the photosensitive drum 46. The exposing unit 58 illuminates a document placed on the document table 48, and light reflected by the document is guided to the photosensitive drum 46. In the posing unit 58, the lens 54 is moved by an exposure driving system (not shown) in the magnification change mode, and at the same time, a plurality of auxiliary lenses 60 are selectively disposed in front of and behind the lens 54, thereby changing a combined focal length of the entire lens system.

A discharger 62, a developing unit 64, a transfer unit 66, a separating unit 68, a cleaning unit 70, a discharging lamp 72, and a charger 74 are arranged around the photosensitive drum 46 from a focusing position of the exposing unit 58 in the rotational direction of the photosensitive drum 46. The charger 74 and the exposing unit 58 are used to form an electrostatic latent image on the photosensitive drum 46. The charge area of the photosensitive drum 46 by the charger 74 is deteined by a control section (not shown). The developing unit 64 applies a toner to the latent image to form a visible or toner image. The transfer unit 66 transfers the toner image to a copy sheet Q, and the separating unit 68 separates the copied sheet Q from the photosensitive drum 46. The cleaning unit 70 removes toner particles left on the photosensitive drum 46 by means of a cleaning blade 76. The discharging lamp 72 discharges the surface charge of the photosensitive drum 46 after cleaning. The discharger 74 causes a nonexposed portion of the photosensitive drum 46 to be set at a low potential through a charge area adjusting unit (not shown) in a reduction copy mode. Therefore, the toner is not attached to the nonexposed porion.

A convey path 80 of the copy sheet Q has a conveyor belt 78 at the bottom of the body 4. The proximal end of the convey path 80 is connected to a paper feed unit 82 for feeding the copy sheet Q. The distal end of the convey path 80 extends continuously with a discharging tray 88 through the fixing unit 84 and a pair of discharging rollers 86. The fixing unit 84 has a heating roller 90 incorporating a Teflon-coated heater 90. The fixing unit 84 also has a pressing roller 92 biased by a spring (not shown) and brought into rolling contact with the roller 90 to be driven thereby. Heat and pressure act on the copy sheet Q passing through the rollers 90 and 92, thereby fixing the toner image on the copy sheet Q. A conveying path 94 is formed between the fixing unit 84 and the discharging rollers 86 to guide the copy sheet Q.

The paper feeding unit 82 will be described in detail with reference to FIG. 5. The paper feed unit 82 has an automatic feeding section 96 and a manual feeding section 98. The automatic feeding section 96 has a cassette or housing 100 for housing copy sheets Q and a feeding roller 102 in rolling contact with the uppermost copy sheet Q in the cassette 100 so as to feed out the sheets one by one. The manual feeding section 98 has a manual feed port 104 and a manual feed roller 106 for feeding the copy sheet Q from the port 104 forward. The copy sheet Q fed by automatic feeding section 96 or the manual feeding section 98 is guided to a pair of first resist or aligning roller 108. The copy sheet Q is then fed forward by the rollers 108 to the transfer unit 66 in synchronism with the operation timing.

The document feeding unit 8 (FIG. 5) will now be described. A separating/feeding unit 110 is arranged in the document feeding unit 8. The separating/feeding unit 110 feeds the documents P one by one from the uppermost document of the stacked documents (to be described in detail later) in a predetermined mode (successively or intermittently). One or more documents Q is fed such that one end of the document is fed to a predetermined position (exposure position) of the document table glass 10 by means of the conveyor belt unit 6 which is arranged to be spaced apart from the document table glass 10 at the upper portion of the body 4. When the document Q is copied, it is fed to the document tray 18. In this manner, the documents placed on the document table 22 are sequentially fed through the separating/feeding unit 110 for copying.

Figure 6:
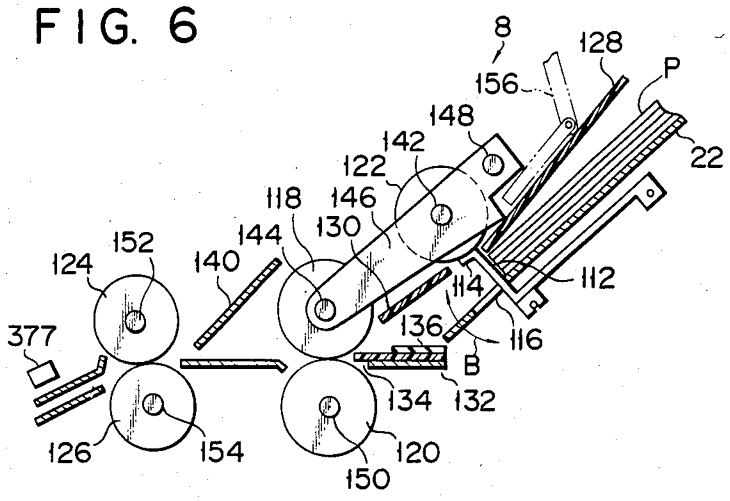
FIG. 6 is a sectional view schematically showing a document feeding unit shown in FIG. 4.

As shown in FIGS. 5 and 6, the document feeding apparatus 110 includes a stopper (or pressing means) 112 which swings in the directions shown by an arrow B in FIG. 6 so as to temporarily stop the stacked documents moving of the document table 22, to make the foremost edges of the stacked documents even, and to intermittently press the documents three times per a second, from below after the document have been dropped along the oblique surface of the document table 22. The stopper 112 has a reversed-L shape and its one end is swingably supportedy the chamber 24. The other end of the stopper 112 is provided, at its right-angled portion, with a striker 114 by which the documents can be pressed upward toward the document table 22. The striker 114 is made of a material such as urethane rubber, for example, having a large friction coefficient. The document table 22 is provided with a hole through which the striker 114 of the stopper 112 projects.

The chamber 24 includes feeding rollers 122 arranged above the striker 114 to feed a document laid on the top of the stack toward a pair of separating rollers 118 and 120, which will be described later. These feeding rollers 122, whose operation will be later described in detail, are brought into contact with a document laid on the top of the stack when the stack is intermittently lifted or pressed toward the feeding rollers by the striker 114, so that only the top document is intermittently and positively fed to the contact portions of the paired separating rollers 118 and 120. Therefore, only the top document can be fed to the paired separating rollers 118 and 120.

When a plurality of documents including the top one are fed, the paired separating rollers 118 and 120 are rotated to separate the documents one by one and only the top document is fed to the conveyor unit 6 on the exposing table 10. A pair of rollers 124 and 126 for conveying a document are arranged between the exposing table 10 and the separating rollers 118, 120. These conveying rollers 124 and 126 whose mechanism will be later described in detail serve to control the timing at which the documents are fed to the conveyor unit 6. The peripheral speed of the these conveying rollers 124 and 126 is the substantially equal to the same of the separating rollers 118, 120.

According to the arrangement as roughly described above, the document feeding unit 8 enables the documents stacked on the document table 22 to be reliably fed one by one from the top of the stacked documents toward the exposing table 10. The document which has reached the exposing table 10 is set at a predetermined position on the exposing table 10 by means of the conveyor unit 6 and then exposed. After exposure, the document is further fed by the conveyor unit 6 (which includes the discharging rollers 14) to the tray 18. On the tray 18, the documents are stacked in feeding order. The same process is repeated for copying a plurality of documents P.

The document feeding unit 8 will be described in more detail with reference to FIGS. 6 and 7.

Arranged above the document table 22 are first and second guide members 128 and 130 for smoothly and reliably guiding the documents P when the documents P, which are stopped halfway to the document table 22 by the stopper 112, are slid down onto the document table 22. The first and second guide members 128 and 130 are made of a plastic material, Mylar Sheet TM, for example, having low friction. The documents are stopped halfway to the oblique document table 22 by the stopper 112 and then slid down onto the document table 22 by releasing the stopper 112. Wrinkled documents P may cause the component members of the document feeding apparatus, such as the feeding rollers 122, to jam. However, this jamming problem can be solved by the first and second guide members.

Figure 7:
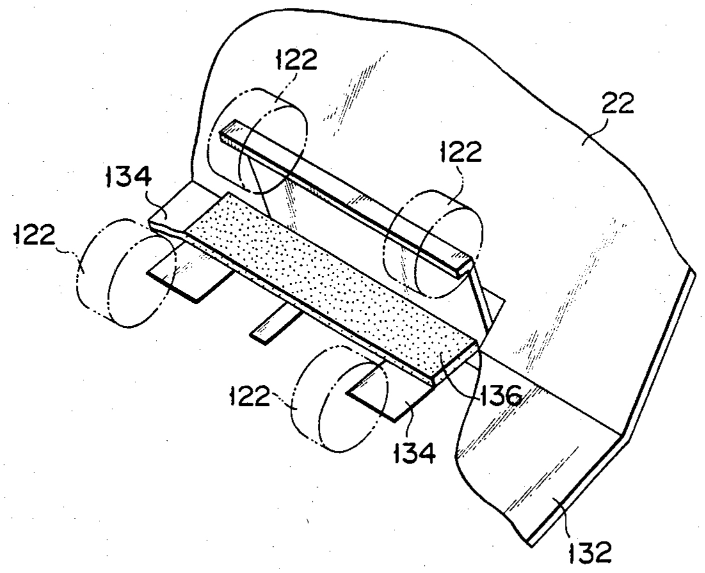
FIG. 7 is a perspective view schematically showing part of a document feeding unit shown in FIG. 6.

As shown in FIG. 7, the lower end portion of the oblique document table 22 is bent to form a guide plate 132 for guiding the foremost edges of the documents sliding down on the document table 22. Third guide members 134 are attached to the guide plate 132 for guiding the leading edges of the documents to the separating rollers 118 and 120. The third guide members 134 are made of a plastic material, such as Mylar Sheet TM, having a low friction coefficient and extending adjacent to the separating roller.

Attached onto the third guide members 134 near the bent portion of the document table 22 which forms the guide plate 132 is a friction control member 136, which may be a sheet of urethane rubber, for example, for striking against the leading edges of the documents, which slide down in stacked state, so as to control the movement of the document by friction.

An upper guide 140 for controlling the bending of the document or guiding the document between the separating rollers 118, 120 and the rollers 124, 126 is arranged.

The feeding rollers 122 and the upper separating rollers 118 are connected integral to a pair of first arms 146 through a feeding roller shaft 142 and an upper separating roller shaft 144, respectively. The first arms 146 are rotatably supported by an arm shaft 148.

The lower separating rollers 120 and the upper and lower rollers 124, 126 are supported by shafts 150, 152 and 154, respectively.

A document detecting mechanism 158 for detecting whether or not the documents are stacked on the document table 22, and which will be later described in detail, is arranged above the document table 22, as shown by a two-dot-dash line in FIG. 6.

Driving mechanisms of the document feeding unit 8 and the conveyor unit 6 will be described with reference to FIG. 9.

These driving mechanisms are provided with a first power transmitting system 162 having a reversible motor 160, for example, which serves as a driving source common to a stopper driver for driving the stopper 122, a feeding roller driver for driving the feeding rollers 118, 120, a separating roller driver for driving the separating rollers 118 and 120, a resist roller driver, and a conveying roller driver.

Figure 9:
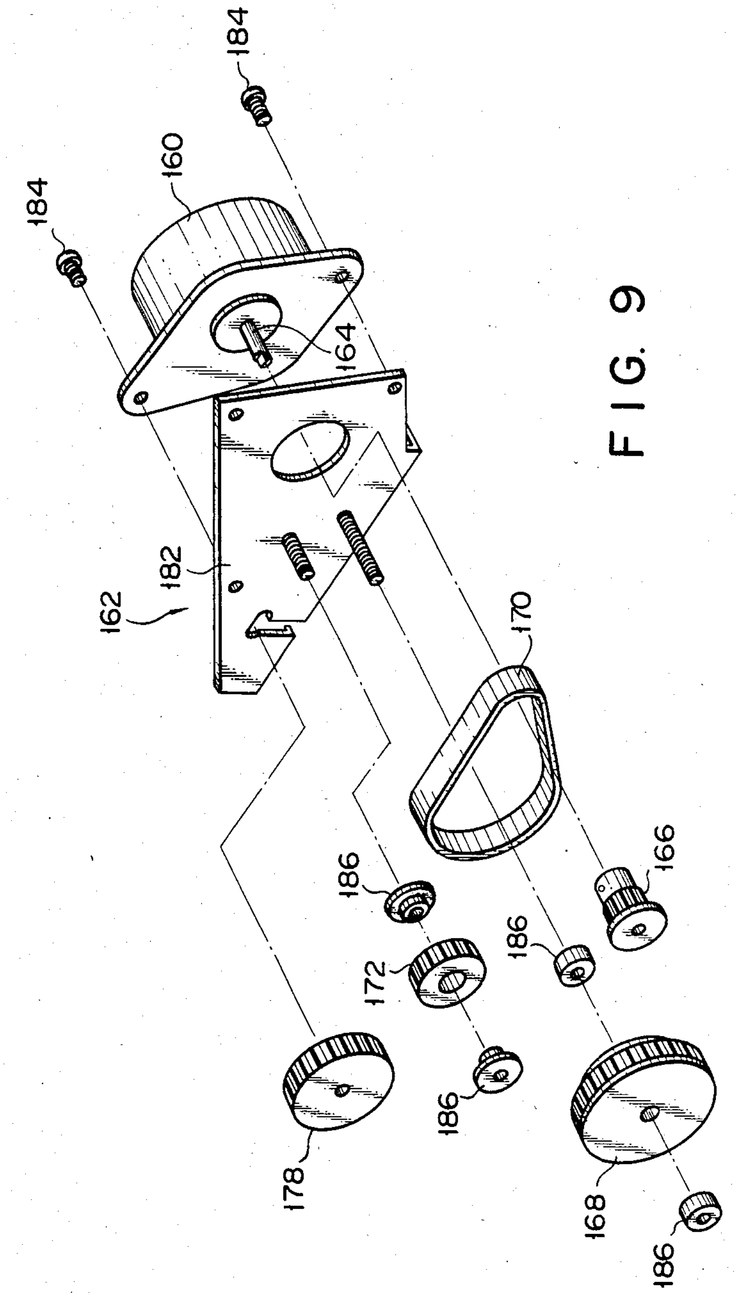
FIG. 9 is an exploded perspective view of a first power transmitting section shown in FIG. 8.

As shown in detail in FIGS. 9 and 10, the first power transmitting system 162 includes a first pully 166 attached to a shaft 164 of the motor 160, and a second pulley 168 to which the rotation of the first pully is transmitted. Stretched between the first and second pulleys 166 and 168 is a first timing belt 170 for transmitting power. A first idle gear 171 is attached to the second pulley 168 through a first shaft 172 and rotates integrally with the second pulley 168. A first drive gear 178 is engaged ith the first idle gear 171 through a second idle gear 176 and supported by a second shaft 180. In FIG. 9, numeral 182 represents a plate for supporting the motor 160 and shafts; 184, screws for attaching the motor to the plate; and 186, stopper members for attaching the gears or pulleys to the shafts.

A second drive gear 190 is connected to one end of the second shaft 180 via a first one-way clutch 188. The second drive gear 190 is engaged with a third drive gear 192 which is fixed to one end of the lower separating roller shaft 150, which is thus rotated integrally with the third drive gear 192. A third pulley 194 is fixed to the lower separating roller shaft 150 between the third drive gear 192 and the left lower separating roller 120. A second timing belt 198 is stretched between the third pulley 194 and a fourth pulley 196, which is fixed to the first arm shaft 148, so as to transmit the rotation of the third pulley 194 to the fourth pully 196. The first arm shaft 148 is connected to a second power transmitting system 200, which will be described later. A pull 202 is in contact with the second timing belt 198 for adjusting the tension of the belt 198.

A fifth pulley 206 is connected to the other end of the second shaft 180 via a second one-way clutch 204. A third timing belt 210 is stretched between the fifth pulley 206 and a sixth pulley 208 to which the rotation of the fifth pulley 206 is transmitted. A pulley 212 is in contacted with the third timing belt 210 for adjusting the tension of the belt 210. The sixth pulley 208 is fixed to one end of a sixth shaft 214, to the other end of which is fixed a fifth drive gear 218 engagable with a fourth drive gear 216 fixed to one end of the lower resist roller shaft 154. The rotation of the motor 160 is transmitted to the lower resist roller shaft 154 to rotate the conveying rollers 124 and 126.

Since the upper rollers 124 are fixed to the rotatable upper resist roller shaft 152, they are rotated when pressed by the lower resist rollers 126 urged by an urging member (not shown).

Fixed to the center portion of the sixth shaft 214 is a sixth drive gear 220, which is connected to a third drive power transmitting section 222 for transmitting power to the conveyor unit 6. The third drive power transmitting section 222 will be described later.

A seventh pulley 244 is fixed to the second shaft 180 between the first drive gear 178 and the fifth pulley 206. A fourth timing belt 230 is stretched between the seventh pulley 224 and an eighth pulley 228 so as to transmit rotation power to each other, said eighth pulley 228 being fixed to a seventh shaft 226 which serves to transmit rotation to the feeding rollers 122. For adjusting the tension of the belt 230, a rubber-coated pulley 232, which has one-way crutch for controlling the feeding direction to keep one way direction, is provided in contact with the fourth timing belt 230. The pulley 232 is contact with the fourth timing belt 230 for adjusting the tension of the belt 230. A irst drive sprocket 236 for transmitting drive force to the feeding rollers 122 is fixed to the seventh shaft 226. An engagement means 238, which will be described later, and which serves to connect and disconnect the clutch 234 is located adjacent to the clutch 234.

The clutch 234 will be described with reference to FIG. 11. Fixed to one end of the seventh shaft 226 by means of a screw 244 is a first boss member 242 having a stepped portion 240. A second boss member 246 is provided on the seventh shaft 246 so as to rotate integrally with the seventh shaft 246. One end portion 256 of a spring joint 248 is fitted onto the stepped portion 240 of the first boss member 242 while the other end portion 250 thereof is fixed to the second boss member 246. Namely, a stepped portion 252 of the second boss member 246 is provided with a groove 254 with which one end of the spring joint 248 is engaged. A sleeve 258 is fitted onto the spring joint 248 and provided with a groove 262 which can be engaged with the other end 260 of the spring joint 248. Formed integral with the outer circumference of the sleeve 258 is a projection 266 with which a lever 264 can be engaged. A cam 268 is fixed to the second boss 246 by means of screw 270 for adjusting the position thereby transmitting drive power to the stopper 112, said cam 268 being rotated integrally with the seventh shaft 226 by means of clutch 234.

According to this arrangement of the clutch 234, the rotation of the sleeve 266 is stopped when the lever 264 is engaged with the sleeve 266, so that slippage occurs between the spring 266 and the stepped portion 240 of the first boss member 242 thereby preventing the rotation of the seventh shaft 226 from being transmitted to the cam 268. When the sleeve 258 is released from the lever 264, the sleeve 258 is left free, so that the spring joint 248 is rotated by the friction between the spring joint 248 and the stepped portion of the first boss member 242. As the result, the rotation force of the seventh shaft 226 is transmitted to the cam 268.

Figure 12:
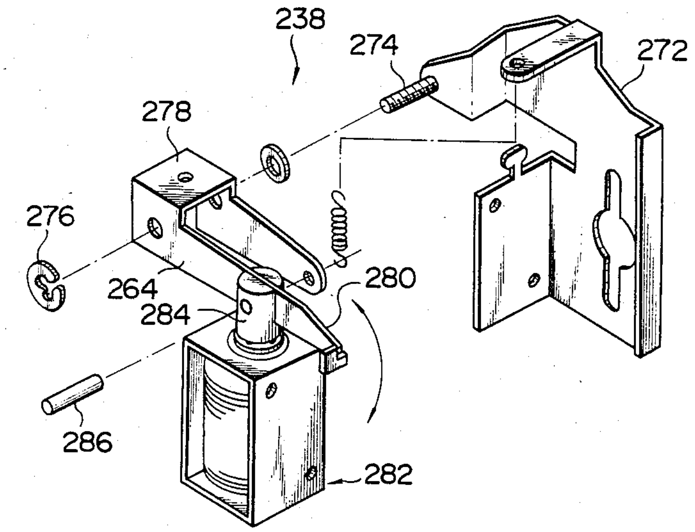
FIG. 12 is an exploded perspective view showing an engaging unit for connecting/disconnecting the clutch shown in FIG. 8.

The engagement means 158 which is engaged with the clutch 234 will be described referring to FIG. 12. The engagement means 238 includes a box-shaped body 272 on which a support shaft 274 is forme for rotatably supporting the lever 264, which can be engaged with the projection 266 of the sleeve 258. The lever 264 is rotatably supported by the support shaft 274, using a stopper ring 276. One end of the lever 264 is provided with a flat striker portion 278 to strike the projection 266 of the sleeve 258, while the other end 280 thereof is fixed to a plunger 284 in a solenoid 282 by means of a pin 286. A solenoid is formed around one end of the plunger 284 to rotate the lever 264 when excited.

Figure 8:
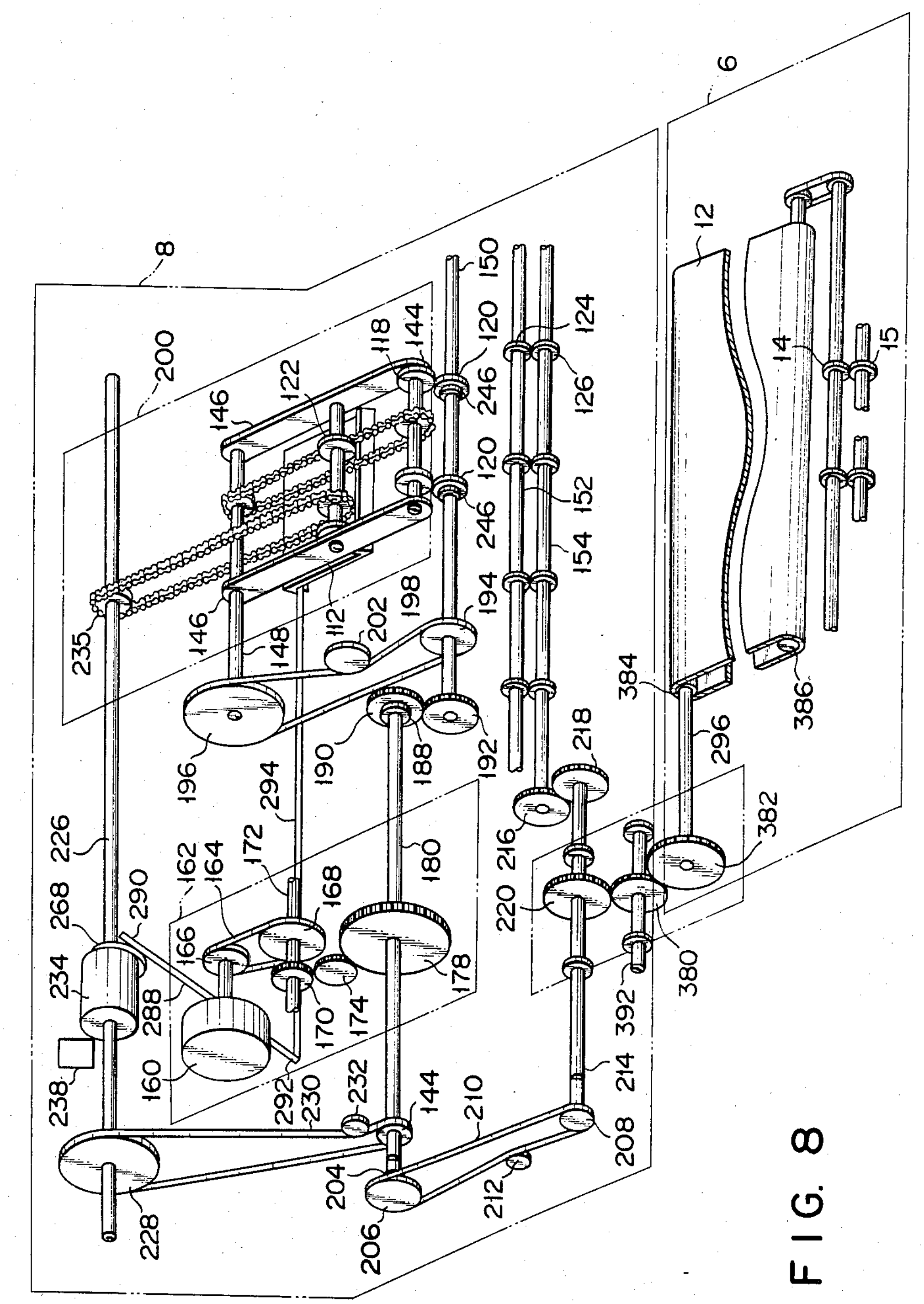
FIG. 8 is a perspective view for explaining a driving mechanism of the document feeding unit shown in FIG. 4.

As shown again in FIG. 8, one end portion 290 of the arm 288 contact the cam 268 at an outer circumference thereof. The other end portion 292 of the arm 288 is fixed to one end portion of a ninth shaft 294 for swinging the stopper 12, so the ninth shaft 294 can be rotated by the rotation of the arm 288.

Figure 14:
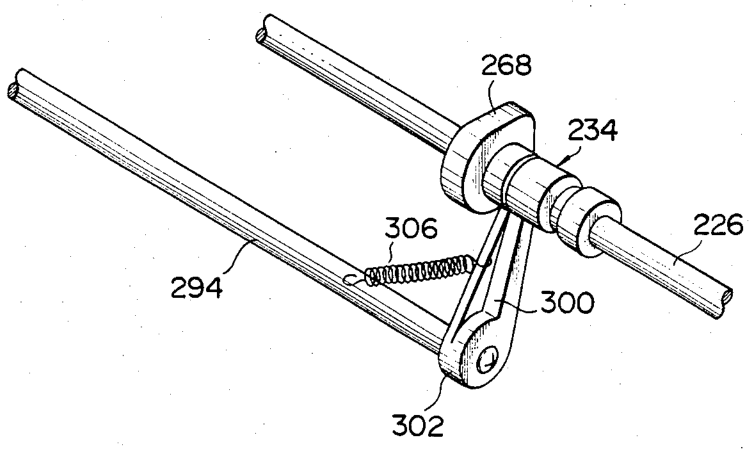
FIG. 14 is a perspective view schematically showing a cam lever in FIG. 13.
Figure 13:
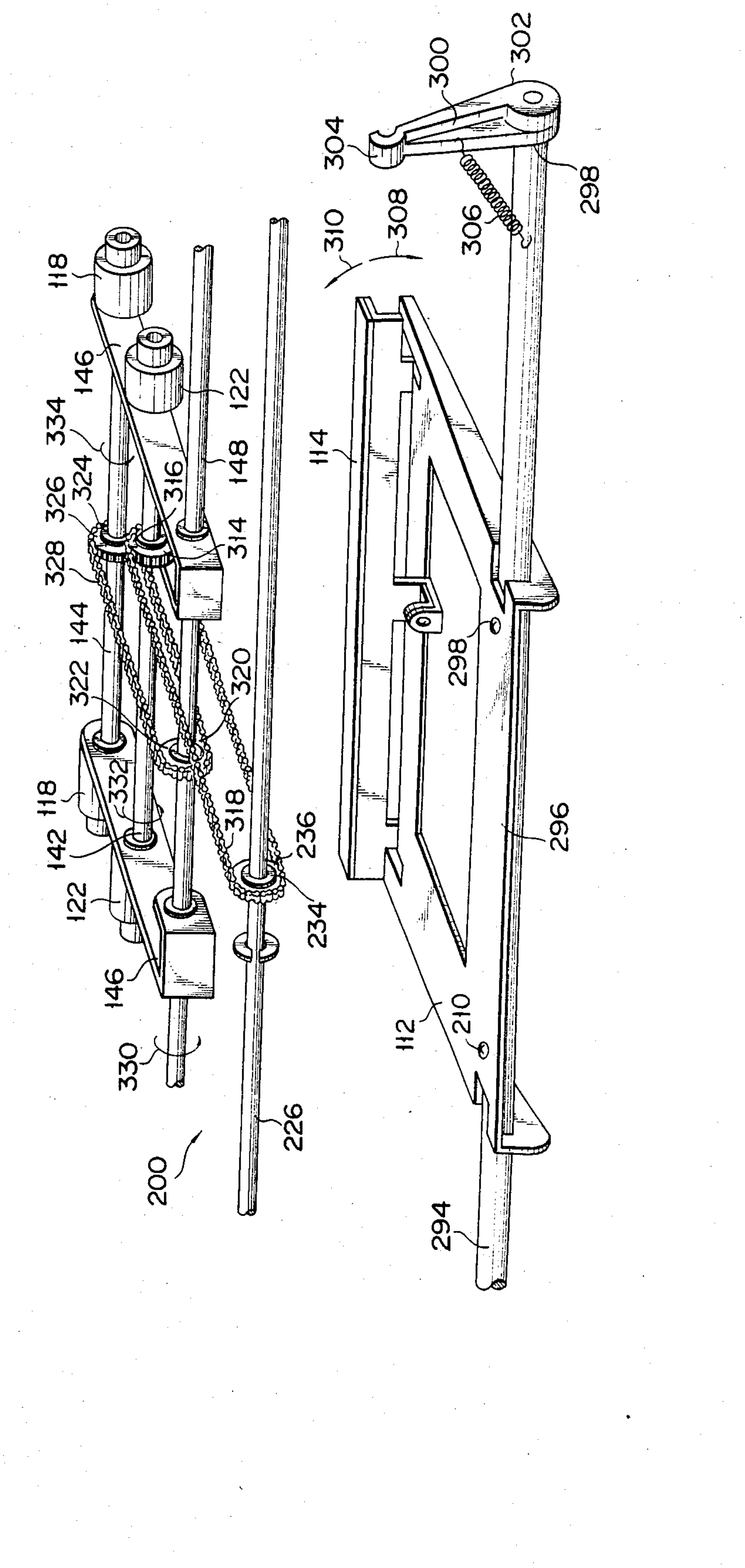
FIG. 13 is a perspective view showing a second power transmitting section shown in FIG. 8.

The second power transmitting system 200 will be described referring to FIGS. 13 and 14.

In the second power transmitting system 200, the other end portion 296 of the stopper 112 is fixed to the ninth shaft 294 by screws 298. Said the other portion 302 of a lever 300 is a fixed to the one end portion 298 of the ninth shaft 294 so as to rotate integrally with the ninth shaft 294. The other end portion 304 of the cam lever 300 contact the cam 268 at an outer circumference thereof. Attached to the cam lever 300 is a spring 306 for urging the ninth shaft 294 in a counter-rotation direction. According to this arrangement, the striker portion 114 of the stopper 112 is rotated in the direction shown by an arrow 308 and projected above the document table 22 when the cam lever 300 is rotated. It is urged by the spring 306 to rotate in a direction shown by an arrow 310; i.e., it is returned below the document table 22 when the cam lever 300 is not rotated. Numeral 312 represents stud for attaching the striker portion 114 to the stopper 112 so that it can swing slightly.

A second drive sprocket 314 is attached via a one-way clutch 316 to the feeding roller shaft 142 to which the feeding rollers 122 are fixed. A chain 318 is stretched between the second drive sprocket 314 and the first drive sprocket 236 to transmit the rotation force of the first sprocket 236 to the feeding rollers 122.

A third drive sprocket 320s attached via a one-way clutch 322 to the arm shaft 148 which is rotated by the motor 160, as already described above. A fourth drive sprocket 324 is attached to the shaft 144 for the upper separating rollers 118 via a one-way clutch 324. A chain 328 is stretched between the third and the fourth drive sprockets 320 and 326 to transmit the rotation force of the first arm shaft 148 to the upper separating rollers 118.

According to the arrangement of the second power transmitting system 200 as described above, the first arm shaft 148, feeding roller shaft 142 and upper separating roller shaft 144 are rotated by the one-way clutches 322, 316 and 324, which are attached to these shafts, respectively, in the direction shown by arrows 330, 332 and 334 only.

Whenthe upper separating rollers 118 are rotated following the rotation of the upper separating roller shaft 144, rotation force is transmitted to the lower separating rollers which contact the upper separating rollers 118. As shown in FIG. 6, however, a rotation force opposite to that of the upper separating rollers is transmitted from the third drive gear 192 to the lower separating roller shaft 144 which supports the lower separating rollers 120. The lower separating roller shaft 144 is therefore provided with limited power transmitting means 336 adjacent to the lower separating rollers 120 to limit the rotation force opposing to each other and to enable the separating rollers 118 and 120 to reliably separate the documents one by one.

Figure 15:
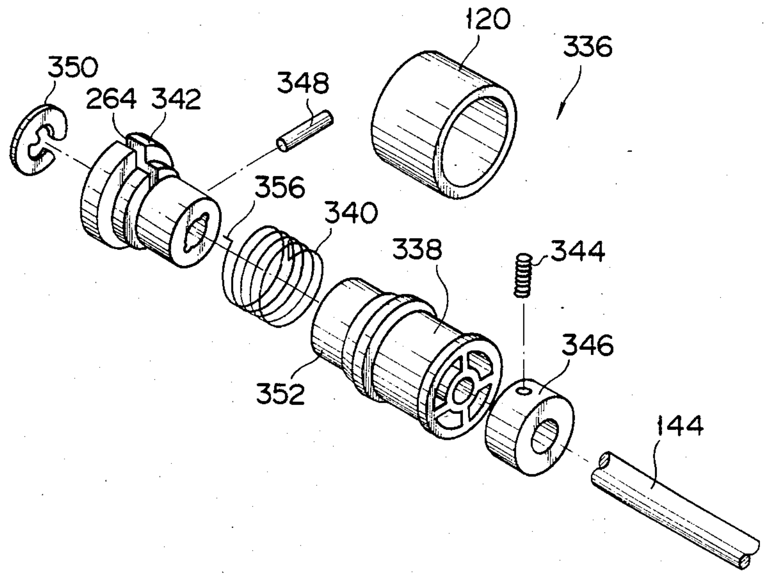
FIG. 15 is an exploded perspective view showing a limited power transmitting mechanism shown in FIG. 8.
Figure 16:
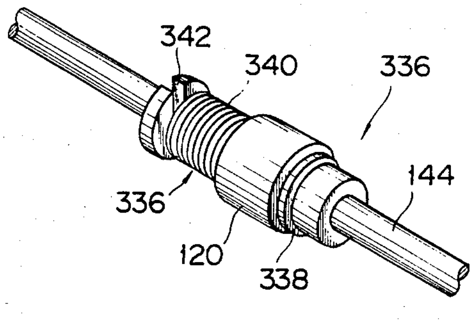
FIG. 16 is a perspective view showing an assembly of the limited power tranmitting mechanism shown in FIG. 15.

These limited power transmitting means 336 will be described referring to FIGS. 15 and 16.

Fixed to the lower separating roller shaft 144 are a roller boss 338 and a spring support member 342 for engaging with a spring 340. The roller boss 338 is fixed to the lower separating roller shaft 144 by a screw and a support member 346 which supports the roller boss 238 and the lower separating rollers 120 are fixedly fitted onto the roller boss 338. The spring support member 342 is fixed to the lower separating roller shaft 144 by a pin 348 and a stopper ring 350. The roller boss 338 is provided at one end thereof with a projection 352 onto which the spring 340 is fitted. The spring support member 342 is provided with a groove 354 which can engage with the spring 340 and with which one end 356 of the spring 340 is engaged. The body of the spring 340 is fitted onto the projection 352 with a predetermined friction force. Friction force between the spring 340 and the projection 352 enables the rotation force of the lower separating roller shaft 144 to be transmitted to the lower separating rollers 120.

According to tese limited power transmitting means 336, slippage occurs between the spring 340 and the projection of the roller boss 338 to thereby cause the lower separating rollers 120 to be reversely rotated, when predetermined retarding torque (which corresponds to the above-mentioned friction force) is applied to the roller boss 338 through the lower separating rollers 120.

Figure 17:
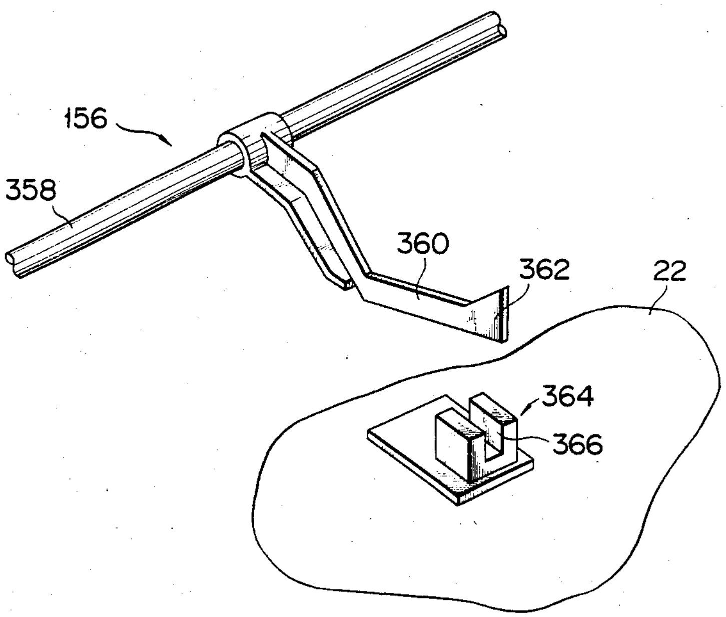
FIG. 17 is a perspective view schematically showing a document detecting mechanism.

The document detecting mechanism 156 shown by the two-dot-dash line in FIG. 6 and serving to detect whether or not any documents are stacked on the document table will be now described referring to FIG. 17.

In the document detecting mechanism 156, one end of a reverse L-shaped lever 360 is rotatably attached to a rod 358 fixed to the chamber 24 (not shown). The other end of the lever 360 is engageable with a detector 364 which will be described later. The detector 364 engageable with the other end 362 of the lever 360 is arranged on the document table 22 and under the lever 360. The detector 364 is provided with a groove 366 through which the other end 362 of the lever 360 passes to interrupt has the light. When the other end 362 of the lever 360 passes through the groove 366, the light is interrupted, which is detected by detector 364. More specifically, when the documents are present between the lever 360 and the detector 364, the other end 362 of the lever 360 is laid on the documents and not engaged with the detector 364. The detector 364 thus detects the presence of documents. When no document is present between the lever 360 and the detector 364, the lever 360 rotates relative to the rod 358 by its own weight and passes through the groove 366 of the detector 364 with its end 362. The detector 364 detects the absence of documents, accordingly. When the detector 364 detects the presence or absence of documents, it supplies a display signal to a display 30 in the body of the copying machine 2 to display the result.

The operation of the document feeding unit 8 will be described in detail with reference to FIGS. 18 through 26.

Figure 18:
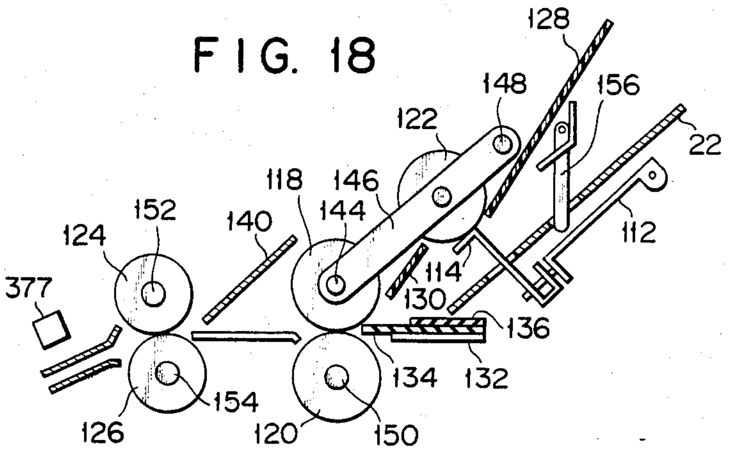
FIGS. 18 to 26 are respectively sectional side views for explaining the operation of the main part of the document feeding unit shown in FIG. 4.

FIG. 18 shows a condition where no document is stacked on the document table 22 yet. The striker portion 114 of the stopper 112 is projected above the document table 22 in this condition.

Figure 19:
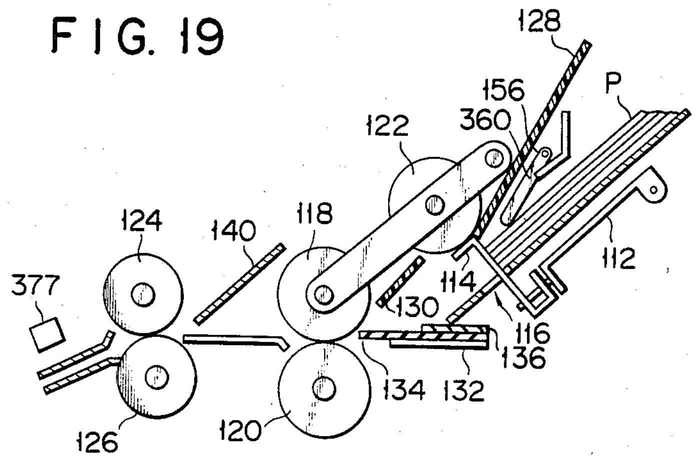

As shown in FIG. 19, the documents P are laid in a stacked sate on the document table 22. The documents are stopped halfway to the oblique document table 22 by the stopper 112. The leading edges of the documents strike against the stopper 112 and thus are made even. Since the lever 369 of the document detecting mechanism 156 is lifted, the detector 364 (shown in FIG. 17) detects the presence of the documents and causes this to be displayed.

When a start button (not shown) on the body 4 of the copying machine is pushed, the motor shown in FIG. 8 is actuated to rotate the first pulley 166 in a predetermined direction. The solenoid in the engagement means 238 (see FIG. 12) is excited same time to connect the clutch 234 (see FIGS. 8 and 11).

Figure 20:
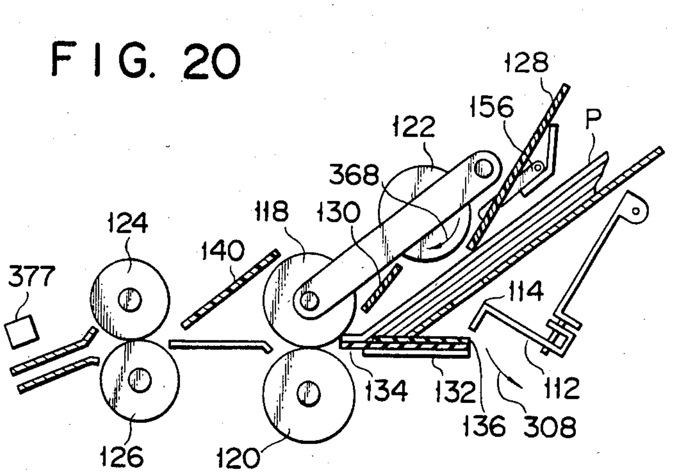

When the stopper 112 is swung below the doument table 22 along the direction shown by the arrow 308, the documents P stopped by the stopper 112 slide down, while being guided by the first guide member 128, on the document table 22 toward the friction control member 136, as shown in FIG. 20. The leading edges of the originals are successively shifted from one another here on the friction control member 136. The lower documents are stopped here on the friction control member 136 because of the weight of those documents which are stacked on them and because a large friction force is thus generated between the lower documents and the friction control member 136. The upper documents, however, have a less friction than the friction control member 136. Therefore, some upper documents including the top one pass over the friction control member 136 and are guided by the third guide members 134 to a position adjacent to the separating rollers 118. On the other hand, the feeding rollers 122 are rotated in the direction of shown by arrow 368. However, the feeding rollers 122 are not brought into contact with the top document P1. The rollers 124 and 126 are rotated in the direction of arrow 370 and 372, respectively.

Figure 21:
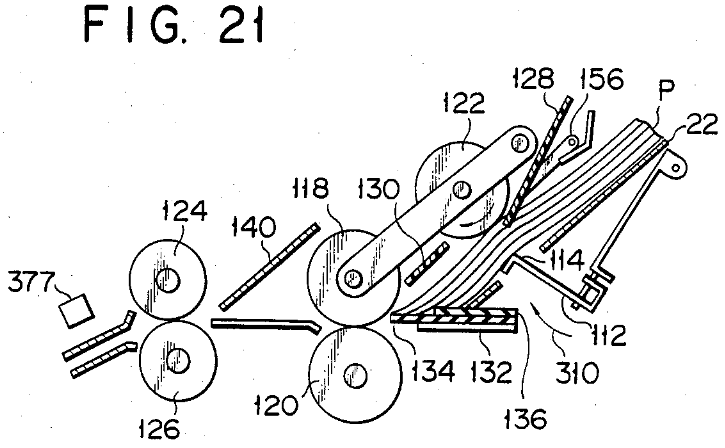

The stopper 112 is swung along the arrow 310, as shown in FIG. 21. Its striker portion thus lifts the documents stacked on the document table. The top document is brought into contact with the feeding rollers by this operation of the stopper and sent between the separating rollers 118 and 120 by the rotating feed rollers.

Figure 22:
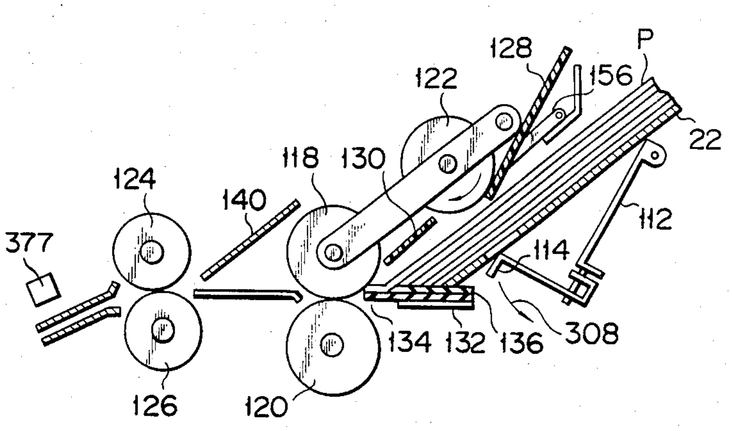

After about 1/6 seconds, the stopper 112 is swung in the direction of the arrow 308 as shown in FIG. 22. Namely, the striker portion 112 is moved below the document table. The top document P is separated from the feeding rollers 122.

Figure 23:
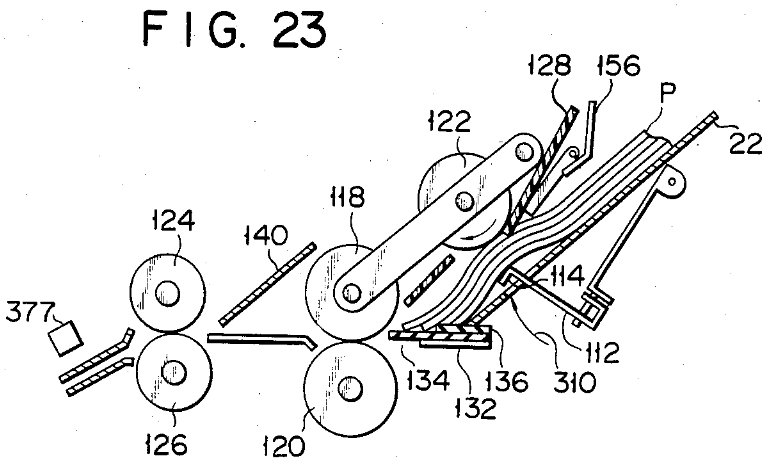

After another 1/6 seconds, the stopper 112 is again swung along the arrow 310, causing its striker portion 114 to lift the documents on the document table, as shown in FIG. 23. The top document this time is again brought into contact with the feeding rollers 122 and thus moved toward the separating rollers.

As described above, the documents P are fed one by one from the top document P, about three times per second in this embodiment, toward the separating rollers 118 and 120. Namely, the stopper 112 is swung about three times pesecond in the direction shown by the arrow 310. This operation of the stopper 112 enables only the top document to be reliably fed between the separating rollers 118 and 120. Even if a number of documents including the top one happen to be sandwiched between the separating rollers 118 and 120, these documents can be conveyed one by one from the top toward the rollers 124 and 126 thanks to the separating capacity of the separating rollers. Conventionally, there was a drawback of often feeding those documents that could not be separated toward the separating rollers. According to this embodiment, however, even if a number of sheets of documents should be fed because of the effect created between the feeding rollers and the stopper 112, their number is so small that they can be reliably separated one by one from the top between the separating rollers 118 and 120.

Even if the feeding rollers 122 should feed a plurality of documents, they necessarily include the top document and therefore, the separating rollers 118 and 120 can reliably separate them one by one from the top (P1).

Figure 24:
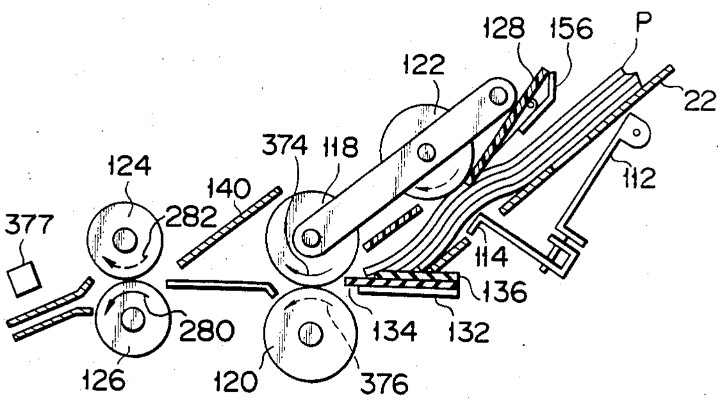

As shown in FIG. 24, the top document can be fed far enough into the separating rollers 118 and 120 by the feeding rollers 122 and the stopper 112. The motor 160 shown in FIG. 8 is then reversely rotated after the lapse of a brief delay. The upper separating rollers 118 are thus rotated in the direction of arrow 376. As a result, the lower separating rollers 120 in contact with the upper separating rollers 118 are rotated in the direction of arrow 376, but a rotation force reverse to the arrow 376 is applied to the lower separating rollers 120. Rotations of these upper and lower separating rollers 118 and 120 will again be described in brief referring to FIG. 8.

When the motor 160 rotates reversely, the rotation force of the motor 160 is transmitted to the lower separating roller shaft 144 through the third drive gear 192. The rotation force of the lower separating roller shaft 144 is transmitted to the upper separating rollers 118 through the lower separating rollers 120, pulleys 194, 196 and first arm shaft 148. In the case of reverse rotation of the motor 160, the rotation force is not transmitted to the rollers 124 and 126 because of a second one-way clutch attached to one end of the second shaft.

In the embodiment, the upper separating rollers 118 rotate in the direction of the arrow 378 at a low speed such as about 100 mm/sec., for example. Rotation force in the direction of the arrow 376 is applied from the upper separating rollers 118 to the lower ones 120, but another rotation force reverse to the arrow 376 is applied from the lower separating roller shaft to the lower separating rollers 120. In short, friction between the upper and the lower separating rollers is larger than the torque transmission force due to the above-described limited power transmitting means, so that the lower separating rollers 120 can be rotated in direction of the arrow 376.

Figure 25:
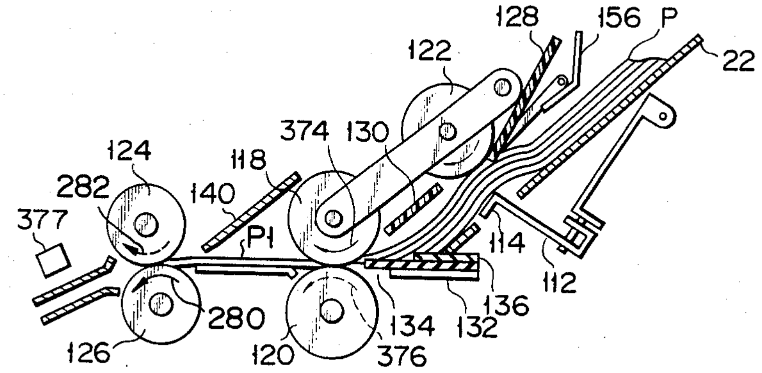

When only one document is reliably inserted between the separating rollers 118 and 120, it is fed between the stopped resist rollers, as shown in FIG. 25. This document is guided and waved by the upper guide 140 and the fourth guide members between the separating rollers 118, 120 and the rollers 124, 126. The leading edge of the document reaches between the rollers 124 and 126 and is lined up by its wave. The motor 160 then stops temporarily.

Figure 26:
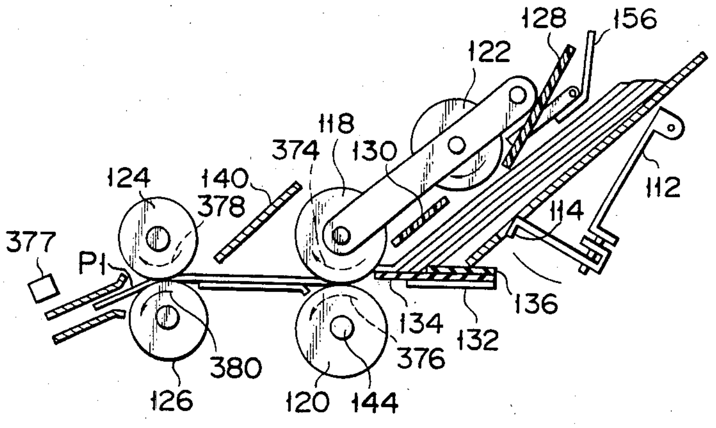

The motor 160 shown in FIG. 8 is then again rotated in the positive direction. The rotation of the motor 160 is transmitted to the lower roller shaft 154 through the second one-way clutch 204, fifth pulley 206, sixth pulley 208, fifth drive gear 218 and fourth drive gear 216. As the result, the rolers 124 and 126 are rotated in the direction of arrows 378 and 380, respectively, as shown in FIG. 26. The document (P1) is conveyed by the rotation of the resist rollers 124 and 126 toward the conveyor unit (see FIG. 5). The separating rollers 118 and 120 are not rotating at this time. Therefore, the document is fed at the leading edge thereof with its back edge sandwiched between the separating rollers 118 and 120 and thus drawn toward the conveying direction. The separating rollers 118 and 120 are rotated by this tension of the document to thereby convey the document. In this case, the foremost ends of the fourth guide members are left free and the reverse V-shaped projections of the fourth guide members are therefore flattened by the tension of the document, so that no unwanted force is applied to the document conveyed to tear it. The document is thus fed to the conveyor unit 6.

The separating operation in a case where a plurality of documents are pulled in between the separating rollers 118 and 120 will be described referring to FIGS. 27 through 30.

Figure 27:
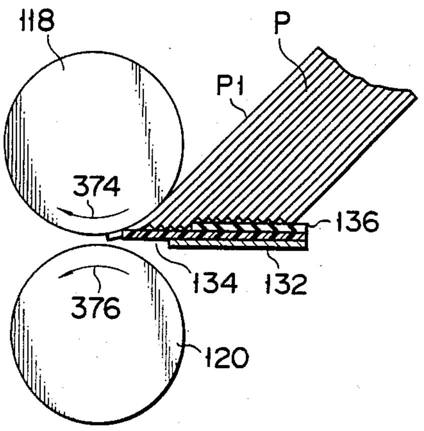
FIGS. 27 to 30 are respectively sectional side views for explaining separation of documents when separating rollers shown in FIG. 5 receive a plurality of documents.
Figure 28:
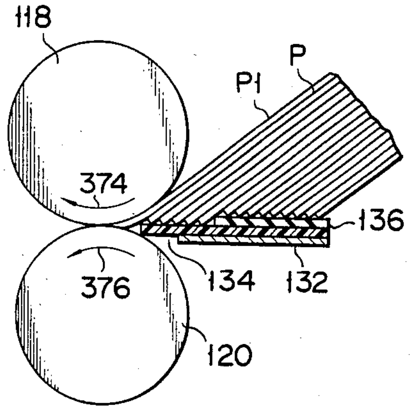
Figure 29:
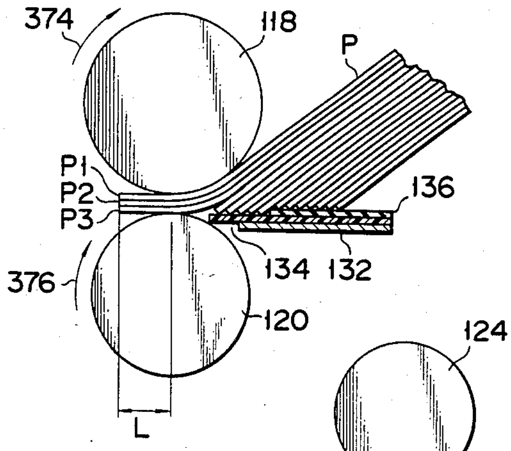
Figure 30:
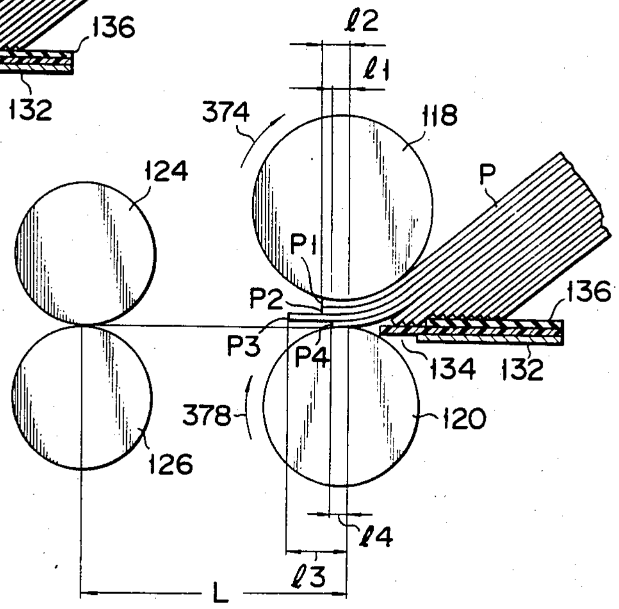

FIG. 27 shows a state where the documents are about to be pulled in between the separating rollers. The foremost edges of the first, second and third documents P1, P2 and P3, out of the stack of documents, may not be trued up, as shown in FIGS. 27 and 28. In this case, the document P3 is first inserted between the separating rollers 118 and 120. Then, the first or top document P1 touches the upper separating rollers 118 to be transferred by friction. The document P1 transmits a conveying force to the adjoining document P2 via the friction force between them, thereby transferring the document P2 in that direction.

However, the lower separating rollers 120 are urged to rotate in the direction of arrow 376 by the limited power transmitting means 336. When the rotation force in the direction of arrow 376 is transmitted through the lower separating rollers 120 to the document P3, the documents P3 and P2 are successively returned since the friction force between the document P3 and the lower separating rollers 120 is larger than that between the documents P2 and P3.

In this embodiment, the peripheral speed of the lower separating rollers 120 is about three times that of the upper separating rollers 118. Therefore, if the document P1 in contact with the upper separating rollers 118 advances 10 mm after the documents P1, P2 and P3 are fed together or the instant that the documents start to be separated, then the document P3 in contact with the lower separating rollers 120 will be returned approximately 30 mm.

Here, let us suppose that the distances from the contact portion between the upper and the lower separating roller 120 to the foremost edges of the documents P2 and P3 at the instant that the documents start to be separated are L and X, respectively. If X is 30 mm or less, the document P2 in contact with the document P3 is quickly returned by the distance L - X. As this action is repeated the documents P2 and P3 are fed back and separated. When the lower separating rollers 120 touch the document P1, that is, when only the document P1 is left between the upper and the lower separating rollers 118 and 120, the sum of the friction forces between the document P1 and the lower separating rollers 120 and between the document P1 and the upper separating rollers 118 is greater than the rotation force in the direction of arrow 378 transmitted through the limited power transmitting means 336, as mentioned before. Thus, the rotation force of the upper separating rollers 118 transmitted through the document P1 to the lower separating rollers 120 surpasses the rotation force in the direction of arrow 378 transmitted throu the limited power transmitting means 336, so that the lower separating rollers 120 are rotated in the direction of arrow 378. Thus, the document P1 is transferred in the feeding direction.

The separating capability of the separating rollers 118 and 120 may be expressed as follows:

$$3(L-l_1)>l_2+l_3+\ldots+l_N$$

Where L (FIG. 30) is the distance from the center line connecting the axes of the separating rollers 118 and 120 to the contact portion between the rollers 124 and 126, (FIG. 30) is the distance from the center line to the leading edge of each of the originals held in layers between the separating rollers 118 and 120, $V_F$ is the peripheral speed of the upper separating rollers 118, $V_B$ is the peripheral speed of the lower separating rollers 120, and $3V_F=V_B$. Thus, the number of separable originals is N which satisfies the above equation.

Figure 31:
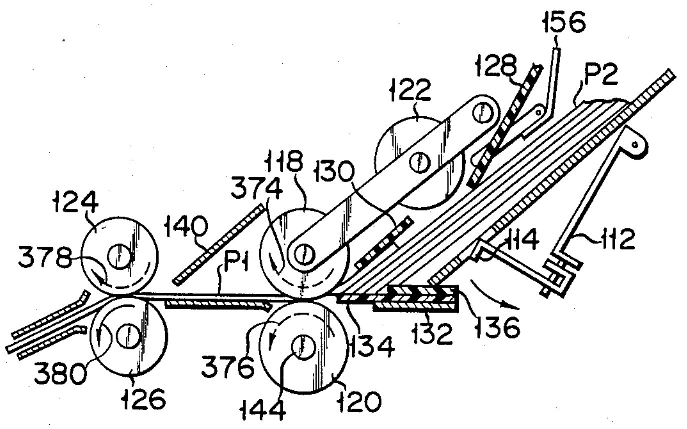
FIGS. 31 to 34 are respectively sectional side views schematically showing the adjacent feed operation at the main part of the document feeding unit shown in FIG. 4.
Figure 32:
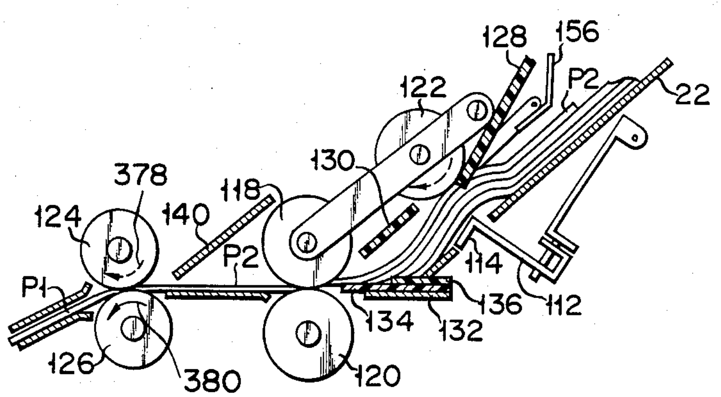

A copying operation will be described with reference to FIGS. 31 to 34 wherein the document feed mode selection button 44 designates "feeding of two successive documents." The first document P1 is conveyed by a rotational force of the pair of rollers 124 and 126 toward the conveyor belt unit 6. In order to feed out the document P2 located below the document P1 in synchronism with the convey operation of the document P1, the leading end of the document P2 is clamped between the contact portions of the upper separating roller 118 and the lower separating roller 120. As shown in FIG. 31, when the trailing end of the document P1 has reached a position which is 30 mm before the contact portions between the upper and lower separating rollers 118 and 120, the motor 160 (FIG. 8) drives the feeding roller so as to transmit the feeding force to the document P1. As shown in FIG. 32, even if the trailing end of the document P1 passes through the contact portions of the upper and lower separating rollers 118 and 120, the motor 160 is continuously rotated. Therefore, by performing separation described above, the document P2 is fed out continuously with the document P1. In other words, the trailing end of the document P1 is substantially kept in contact with the leading end of the document P2, and the documents P1 and P2 are continuously fed out. The motor 160 is continuously rotated by a sufficient distance until the leading end of the next document P2 reaches the contact portions of the rollers 124 and 126. Thereafter, the motor 160 is stopped.

Figure 33:
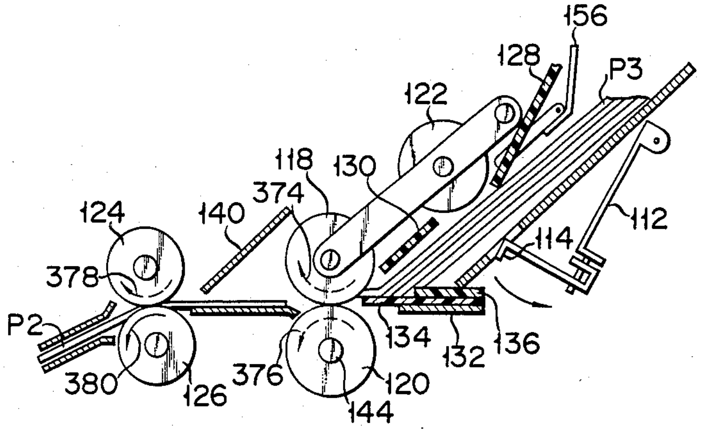
Figure 34:
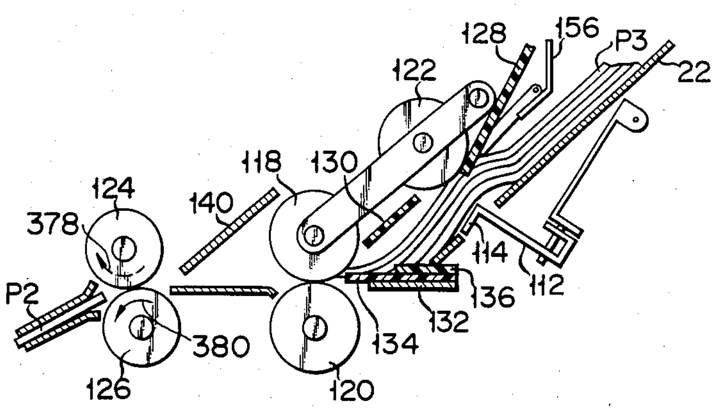

As shown in FIGS. 33 and 34, the document P2 is fed by the driving force of the rollers 124 and 126 toward the conveyor belt unit 6. In this case, a document counter 377 (FIG. 6) arranged at the document feedout side of the separating/feeding unit 110 counts the number of documents fed out to the conveyor belt unit 6. Therefore, in "feeding of two successive documents," when a sufficient time interval for feeding out the two successive documents by the separating/feeding unit 110 has elapsed, the counter 377 holds a count representing an even number until the next document is fed. For this reason, assume that only one document is fed finally when the number of documents set on the exposing table 22 is an odd number, and that the count of the document counter 377 holds an "odd number" for longer than a predetermined period of time, document jam occurs in the separating/feeding unit 110. In this case, the control unit detects document jam in response to a signal from the document counter 377 and causes a display unit (not shown) to display jam, so that the operator can know that document jam has occured.

The third driving force transmitting mechanism 222 for transmitting the driving force to the conveyor belt unit 6 will be described with reference to FIGS. 8 and 35.

As shown in FIG. 8, an eighth driv gear 382 meshes through a seventh drive gear 380 with a sixth drive gear 220 to which the rotational force of the motor 160 is transmitted. The eighth drive gear 382 is fixed on a belt roller shaft 388 for integrally rotating belt rollers 384 and 386 around which the conveyor belt 12 is looped. The third driving force transmitting section 222 does not receive the driving force when the conveyor belt unit 6 is opened, as shown in FIG. 4. However, when the conveyor belt unit 6 is closed, the section 222 transmits the driving force. The construction of the section 222 will be described with reference to FIG. 35.

The seventh drive gear 380 is rotatably supported by a holder arm 390 through a ninth shaft 392 (see FIG. 8), said holder arm 390 being rotatably attached to the sixth shaft 214. Fixed to one end 394 of the holder arm 390 is one end of a spring 396, the other end of which is fixed to the body 4 of the copying machine 2, thereby urging the holder arm 390 around the sixth shaft 214 in the direction of an arrow 398. A control member 402 for controlling the rotation of the holder arm 390 is arranged at that position on the body 4 which is adjacent to one end 394 of the holder arm 390. Arranged on a side of the seventh drive gear 380 is a first pitch circle disc 404 which rotates integrally with the seventh drive gear 380 and which has a radius equal to that of pitch circle of the seventh drive gear 380. Similarly, a second pitch circle disc 406 is arranged on a side of an eighth drive gear 382 and contacts the first pitch circle disc 404 on their outer circumferences.

Figure 35:
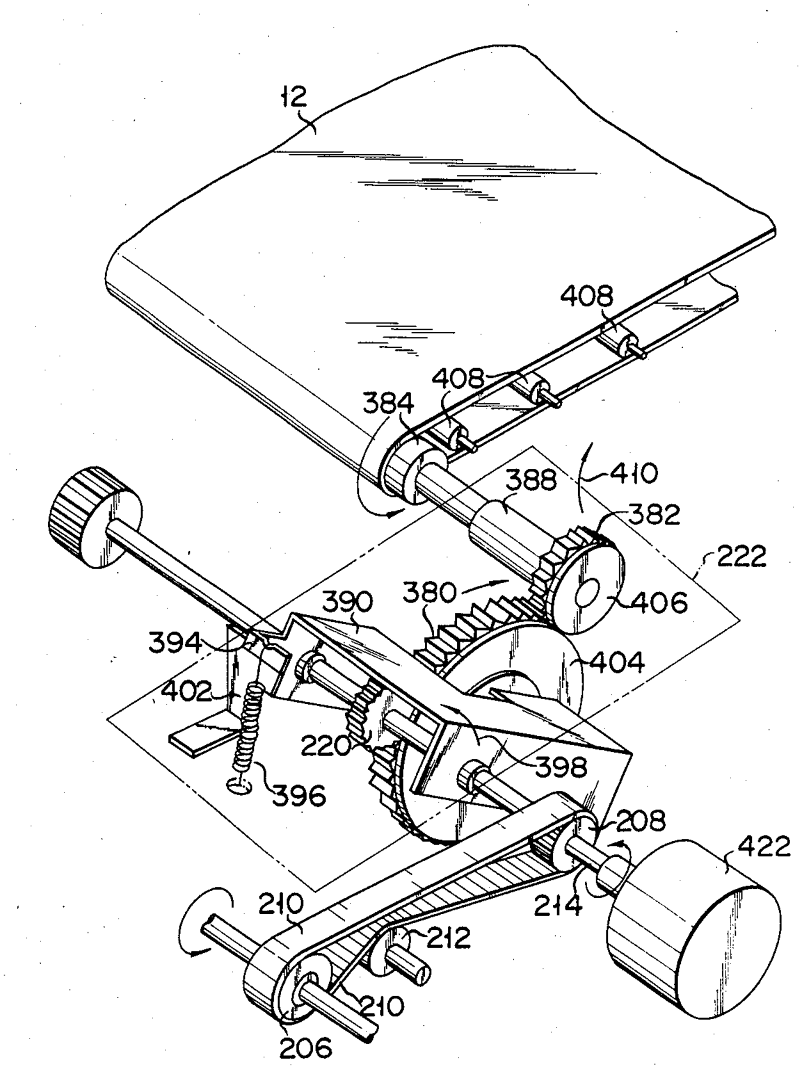
FIG. 35 is a perspective view schematically showing a conveyor belt unit and its driving mechanism.

FIG. 35 shows the state of the third drive power transmitting section when the conveyor unit 6 is closed. When the conveyor unit 6 is brought into an open position, the eighth drive gear 382 moves in the direction of an arrow 410 to be released from the seventh drive gear 380, thereby preventing power from being transmitted to the eighth drive gear 382. The conveying belt 12 is, accordingly, not driven.

When the conveying belt unit 6 is closed, the eighth drive gear 382 is engaged with the seventh drive gear 380 against the action of the spring 396. Upon the engagement of these two gears, the first and second pitch circle discs 404 and 406 arranged on their corresponding sides of the gears, respectively, are brought into contact with each other. The distance between the center axial line of the seventh drive gear 380 and the center axial line of the eighth drive gear 382 can be thus controlled. Even when a tooth of the seventh drive gear 380 comes face to face to the one of the eighth drive gear 382 upon the engagement of these two gears, the seventh drive gear 380 is urged against the eighth drive gear 382 so that they can be engaged with each other, with their teeth fitted into their teeth grooves, at the instant that the seventh drive gear 380 is driven.

The pitch circle discs arranged in the third drive power transmitting section prevent noise, vibration and irregular wearing of the gears during power transmission.

Figure 36:
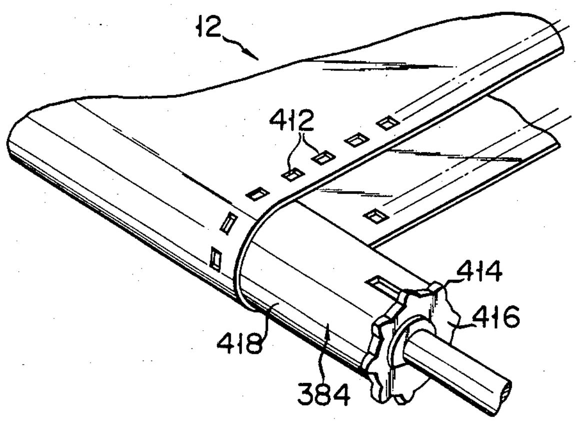
FIG. 36 is a perspective view schematically showing a conveyor belt and a driving roller.
Figure 37:
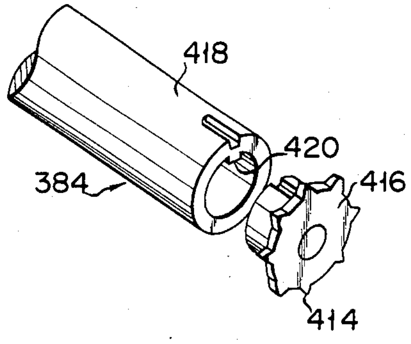
FIG. 37 is an exploded perspective view of the driving roller.

The conveyor belt 12 and the belt roller 384 will be described in detail with reference to FIGS. 36 and 37.

A number of engaging holes 412 are formed in the surface of the conveyor belt 12 at a predetermined pitch. Driving belt wheels 416 having engaging projections to be engaged with the engaging holes 412 are arranged at two ends of the belt roller 384. As shown in FIG. 37, the driving belt wheel 416 is inserted in a hollow belt roller body 418 and can be rotated together with the body 418 by means of a key 420 formed on the inner surface of the body 418. The other belt roller 386 (FIG. 5) is arranged in the same manner as described above. The driving belt wheel 416 is arranged on at least the driving belt roller 386. The engaging projections 414 need not be formed on the belt roller 386. When the conveyor belt 12 and the belt roller 386 are constructed in the manner described above, the conveyor belt 12 will not slip on the belt roller 384. The belt roller 384 (i.e., the driving belt wheel 416) can be rotated by a belt motor 422 (FIG. 36) as a driving member for driving the document to the predetermined position, thereby controlling the driving distance of the motor 422 so as to properly stop the document in the exposure position. In addition, an electromagnetic brake (not shown) is mounted on the shaft of the motor 422, so that the conveyor belt 12 or the belt roller 384 will not overrun by an inertia force. The document can be properly fed/stopped with high precision.

Figure 38:
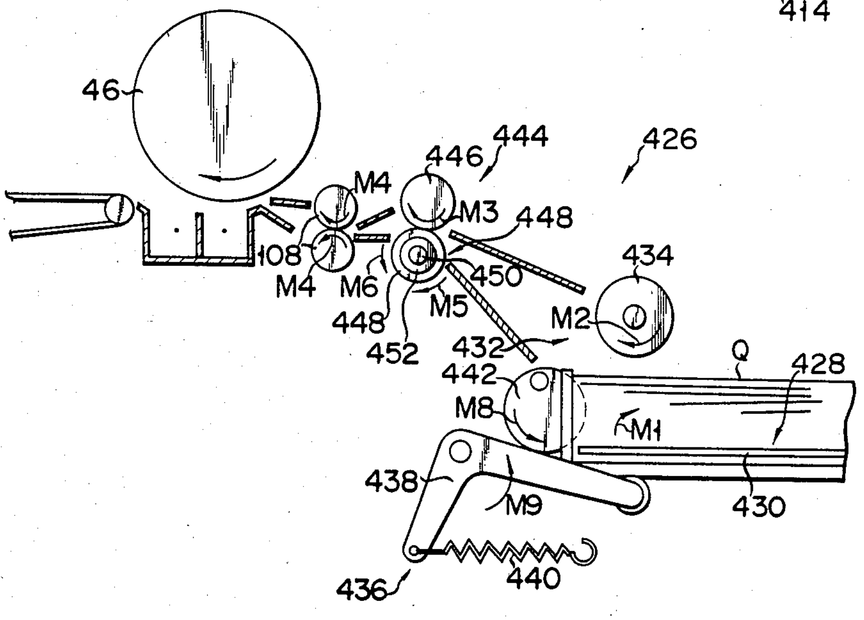
FIG. 38 is a sectional view schematically showing a paper feed unit.

The sheet feeding unit 82 for continuously feeding the copy sheets will be described with reference to FIGS. 5 and 38. The sheet feeding unit 82 has a function for continuously feeding a plurality of copy sheets.

The feeding unit 82 comprises a first feeding section 424 and a second feeding section 426 arranged below the first feeding section 424, as shown in FIG. 5. The detailed arrangement of the second feeding sction 426 will be described with reference to FIG. 38. Reference numeral 428 denotes a second cassette or housing in which the copy sheets Q are stacked. A sheet table 430 for supporting the copy sheets can be pivoted in a direction of arrow M1 while the copy sheets are stacked thereon.

A pickup mechanism 432 is arranged in the second feeding section 426 to oppose the set position of the second cassette 428 so as to pick up the copy sheets Q from the second cassette 428. The pickup mechanism 432 comprises: a pickup member such as a pickup roller which is brought into rolling contact with the uppermost sheet stacked in the second cassette 428 so as to feed the copy sheet forward in synchronism with rotation in a direction of arrow M2; and an urging mechanism 436 for intermittently moving the sheets stacked on the table 430 toward the pickup roller 434 and for urging the copy sheet around the pickup roller 434. The pressing mechanism 436 comprises: a pressing lever 438, an intermediate portion of which is mounted on a pivot pin and one end portion of which is engaged with the bottom surface of the document table 430; a spring 440 for biasing the pressing lever 438 to bring one end portion of the pressing lever 438 into contact with the bottom surface of the table 430; and a regulating cam 442 for regulating the pivot angle of the pressing lever 438. The pressing lever 438 serves as a pressing member for urging the copy sheet from the cassette 428 to the pickup roller 434. The copy sheet Q urged by the pressing mechanism 436 against the outer surface of the pickup roller 434 is rotated by the pickup roller 434 in the direction of arrow M2 and is fed out from the second cassette 428 in the forward direction.

A separating section 444 is arranged above the pickup roller 434 to receive the copy sheets Q picked up by the takeup mechanism and to separate the copy sheets one by one from the uppermost sheet.

The construction and the function of the separating section 444 are substantially the same as the separating/feeding unit 110 and will be briefly described hereinafter. The separating section 444 comprises: a feeding roller 446 to be rotated in the sheet pickup direction, e.g., in a direction (clockwise) of arrow M3; and a separating roller 448 arranged to oppose the feeding roller 446. The separating roller 448 is rotated in a direction (counterclockwise) opposite to the sheet pickup direction when a plurality of sheets are present between the feeding roller 446 and the separating roller 448. The separating roller 448 has a separating/feeding shaft 450 which is rotated in the direction (clockwise) of arrow M5 and a limited power transmitting mechanism 452 for transmitting the rotational torque of the separating/feeding shaft 450 within a predetermined range. The limited power transmitting mechanism 452 transmits the torque to the separating roller 448 and is coupled to the separating roller 448 opposing the feeding roller 446. The limited power transmitting mechanism 452 has the same construction as the limited power transmitting mechanism 336 shown in FIGS. 15 and 16, and a detailed description thereof will be omitted.

The sheets fed by the separating section 444 are fed to the rollers 108. The rollers 108 receive the sheets from the separating section 444 and feed the sheets at a speed which is the same as the feeding speed to the photosensitive drum 46. In other words, the rollers 108 are arranged to be rotated in the direction indicated by arrow M4. The feeding roller 446 is rotated in a direction (counter clockwise) of arrow M3 through a proper drive system, and the separating roller 448 is rotated in a direction (clockwise) of arrow M6. When a plurality of copy sheets are stacked and abut against nip portions of the rollers 446 and 448, the uppermost copy sheet is fed forward upon rotation of the feeding roller 446, and the copy sheet immediately below the uppermost sheet is fed back upon rotation of the separating roller 448. In this manner, the separating section 444 properly feeds out only the uppermost copy sheet in the same manner as in the separating/feeding unit 110.

Figure 39:
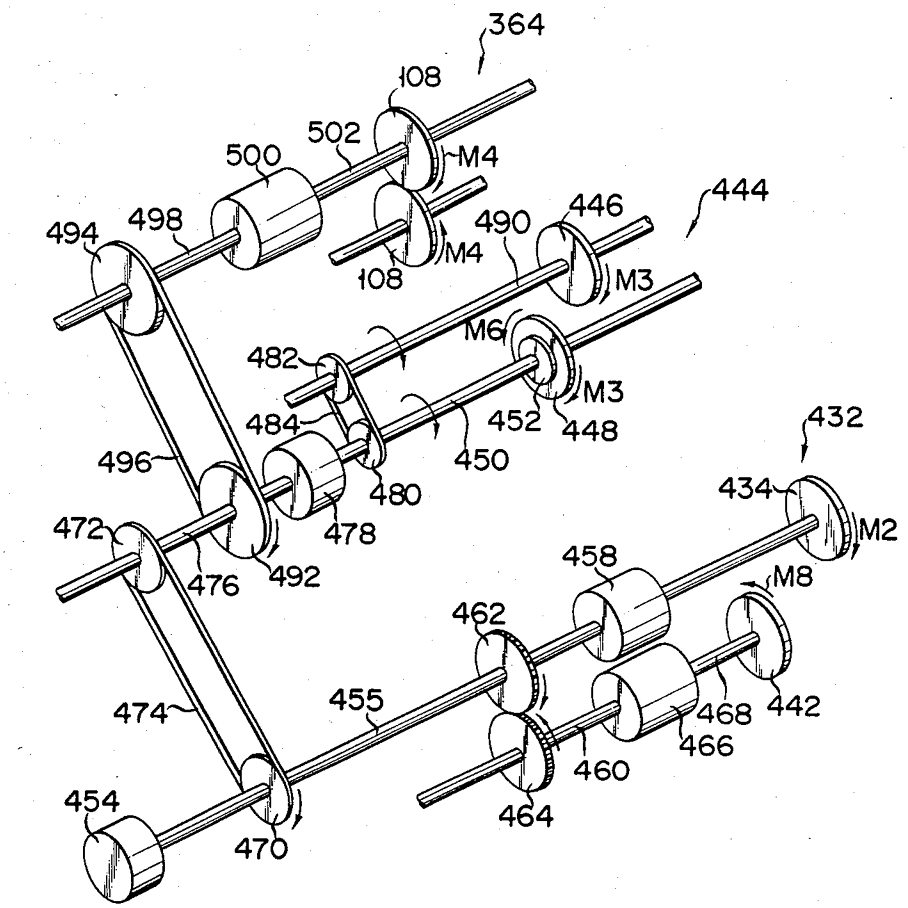
FIG. 39 is a perspective view schematically showing a driving mechanism of te paper feed unit.

The driving system of the second feeding section 426 will be described with reference to FIG. 39. Referring to FIG. 39, reference numeral 454 denotes a motor which is coupled to one end of a driving shaft 455. The other end of the driving shaft 455 is connected to the driving side of a first clutch 456. The pickup roller 434 is connected to the driven side of the first clutch 456 for rotation therewith. A first cam shaft 460 is arranged to be parallel to the driving shaft 455. The first cam shaft 460 receives power from the driving shaft 455 through a pair of spur gears 462 and 464. The first cam shaft 460 is connected to the driving side of a second clutch 466. The driven side of the second clutch 466 is connected to a second cam shaft 468 rotated together with the regulating cam 442. A first separating/feeding shaft 476 is arranged to receive power from the driving shaft 455 through a pair of pulleys 470 and 472 and a belt 474. One end of the first separating/feeding shaft 476 is connected to the driving side of a third clutch 478. The driven side of the third clutch 478 is connected to a second separang/feeding shaft 450. The rotation of the second separating/feeding shaft 450 is transmitted to a third separating/feeding shaft 490 through pulleys 480 and 482 and the belt 484. The feeding roller 446 is mounted on the third separating/feeding shaft 490. The rotation of the first separating/feeding shaft 476 is transmitted to a first resist roller shaft 498 through pulleys 492 and 494 and a belt 496. One end of the first resist roller shaft 498 is connected to the driving side of a fourth clutch 500. The driven side of the fourth clutch 500 is connected to a second resist roller shaft 502 and is rotated together with the first resist roller 108. The motor 454 drives the pickup roller 434 to pick up the next sheet from the second cassette 428 while the trailing end portion of the document is in contact with the feeding roller 446 and the separating roller 448. The regulating cam 442 rotated by the motor 454 drives the pressing lever 438 away from the pickup roller 434 when the copy sheets are subjected to separation.

Figure 40:
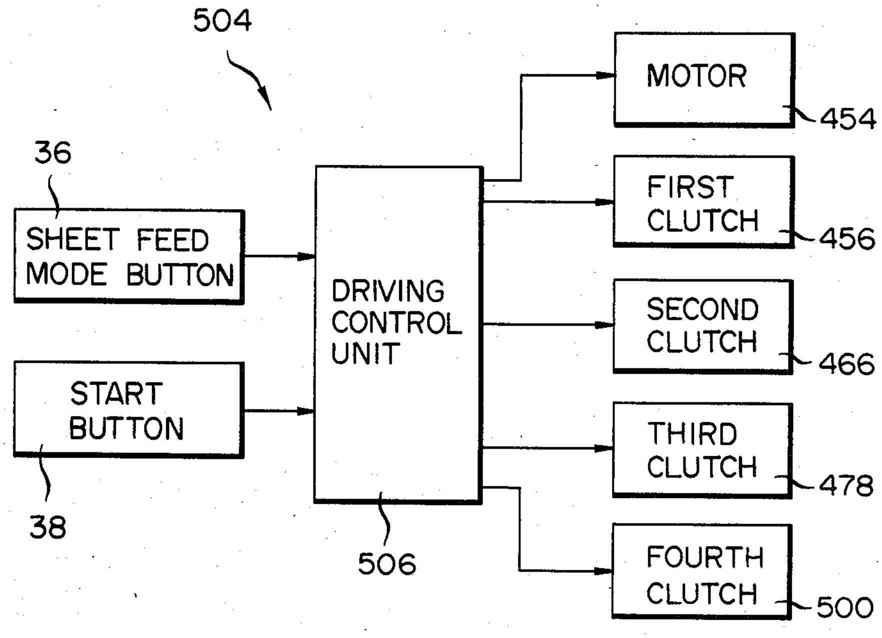
FIG. 40 is a block diagram showing the driving control of the the paper feeding unit.

A driving control system 504 of the second feeding section 426 will be described with reference to FIG. 40. The driving control system 504 has a driving control unit 506 connected to the paper feed mode selection button 36 and the start button 38 which are arranged in the operation panel 30 (FIG. 4), the motor 454, the first clutch 456, the second clutch 466, the third clutch 478 and the fourth clutch 500. The driving control unit 506 controls these components.

The driving cntrol unit 506 controls the second feeding section 426 such that two copy sheets are fed without an interval therebetween, i.e., at zero pitch when "feeding of two successive sheets" is performed. Before the trailing end of the copy sheet fed by the feeding roller 446 passes through the feeding roller 446, the next copy sheet is fed by the pickup roller 434 so as to cause this sheet to reach a position between the feeding roller 446 and the separating roller 448. When single sheet feeding is designated by the sheet feed mode selection button 36, only a single sheet is fed.

The respective operations of the second feeding section 426 will be described with reference to FIGS. 38 to 44.

"Single Sheet Feeding"

A case will be described wherein the paper feed mode selection button 36 designates single paper feeding to feed a single sheet from the second feeding section 426. As shown in FIG. 38, a copy sheet detecting means (not shown) is operated at the initial state of the cassette 428 for housing the copy sheets Q, when the motor 454 (shown in FIGS. 39 and 40) is operated. Upon rotation of the motor 454, the pickup roller 434 is rotated in the direction of arrow M2 through the first and second clutches 456 and 466, and the regulating cam 442 is rotated in the direction of arrow M8.

When the regulating cam 442 is rotated, the pressing lever 438 is pivoted in the direction of arrow M9 by the biasing force of the spring 440 in accordance with the pivotal movement. When the regulating cam 442 is rotated by a half revolution, the clutch 466 is deenergized to stop the regulating cam 442.

Figure 41:
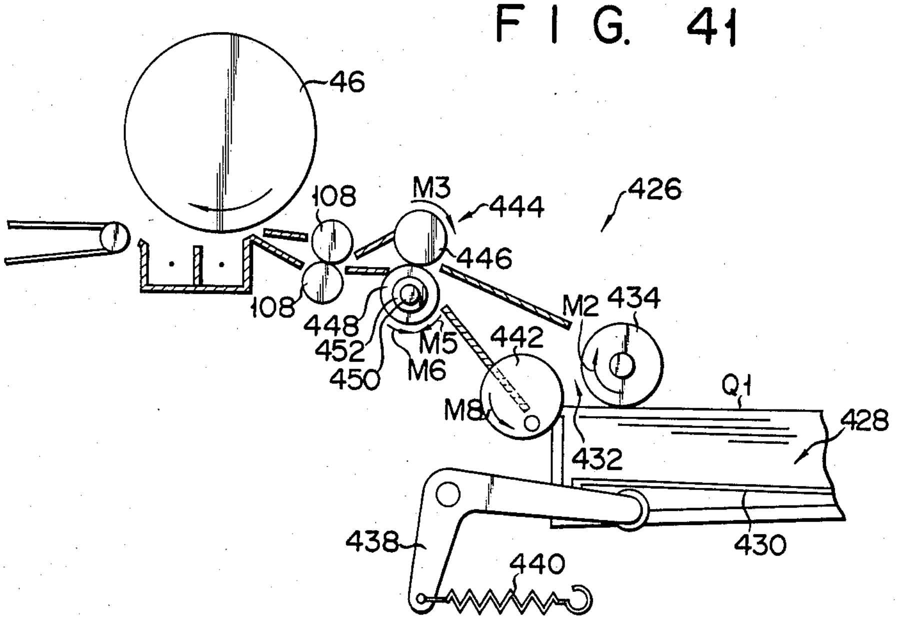
FIGS. 41 to 48 are respectively sectional side views schematically showing the operation of the paper feed unit.

As a result, as shown in FIG. 41 the uppermost copy sheet Q1 in the cassette 428 is brought into tight contact with the outer surface of the roller 434. In this case, since the roller 434 is rotated in the direction of arrow M2, the uppermost copy sheet Q1 contacting the roller 434 and several copy sheets Q1 under the uppermost sheet Q1 are fed toward the contact portions of the feeding roller 446 and the separating roller 448.

Figure 42:
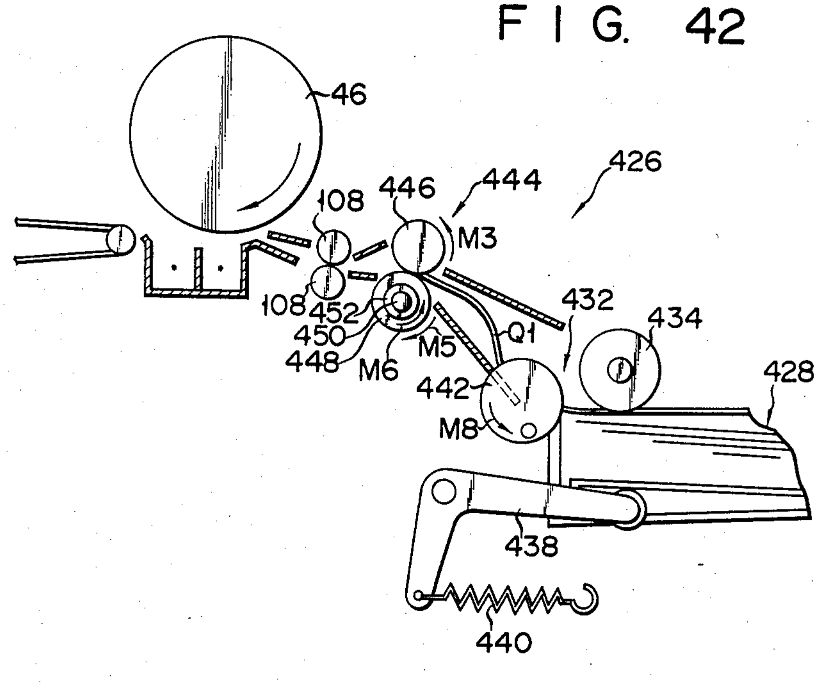
Figure 43:
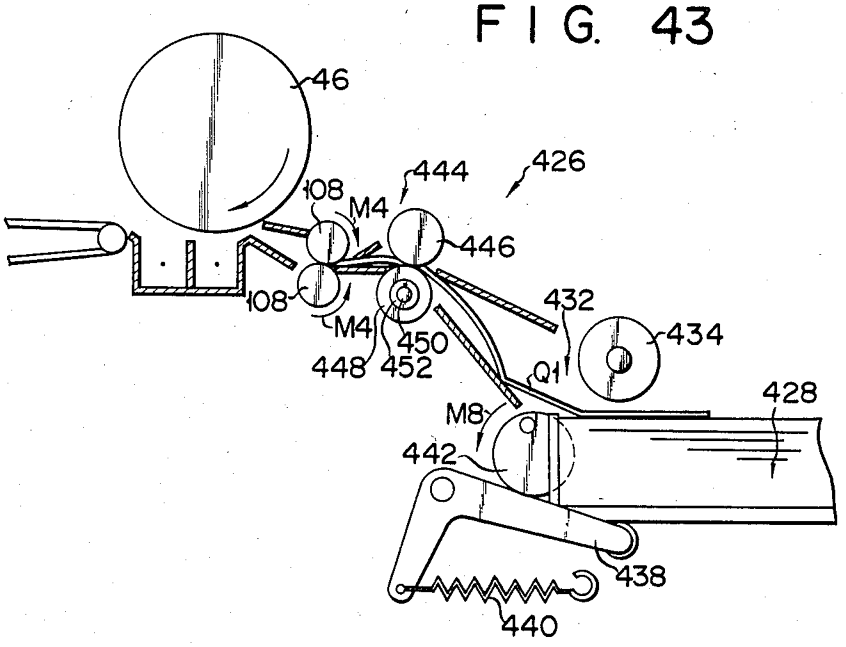

The feeding roller 446 is rotated in the direction of arrow M3, and the separating roller 448 is rotated in the direction of arrow M6, as shown in FIG. 42. When the copy sheets have reaed a position between the feeding roller 446 and the separating roller 448, the rollers 446 and 448 are temporarily stopped. However, the rollers 446 and 448 are then driven again. The pickup roller 434 is stopped, and the regulation cam 442 is driven by a half revolution in the direction of arrow M8. As a result, the copy sheet Q1 is fed forward by the feeding roller 446. When another copy sheet to be stacked on the uppermost copy sheet Q1 by means of the separating section 444 is fed in a position between the feeding roller 446 and the separating roller 448, the underlying sheet is fed back upon rotation of the separating roller 448 in the direction of arrow M5. On the other hand, when the regulating cam 442 is rotated by a half revolution in the direction of arrow M8, the regulating cam 442 is pivoted against the biasing force of the pressing lever 438 in the counterclockwise direction in FIG. 42. As shown in FIG. 43, the copy sheets stacked in the cassette 428 are moved downward to form a space between the roller 434 and the stacked copy sheets. The copy sheet is fed back by the separating section 444, so that the copy sheet is moved downward without being stopped by the roller 434 and the stacked copy sheets and will not be fed to the position between the feeding roller 446 and separating roller 448 again. Since the separating section 444 is located above the roller 434 in the second feeding section 426, the separating operation of the separating section 444 can be performed with high reliabily. The copy sheet is fed back by the separating roller 446 through the limited power transmitting mechanism 452. The feed-back operation of the limited power transmitting mechanism 452 is the same as the limited power transmitting mechanism 336 (shown in FIGS. 15 and 16) described with reference to the separating feeding unit 110, and a detailed description thereof will be omitted.

As shown in FIG. 43, only the uppermost copy sheet Q1 is fed toward the resist rollers 108. When the uppermost copy sheet Q1 is fed by a sufficient distance until the uppermost copy sheet Q1 reaches the nip portion of the resist rollers 108, the feeding roller 46 and the separating roller 448 are stopped.

Figure 44:
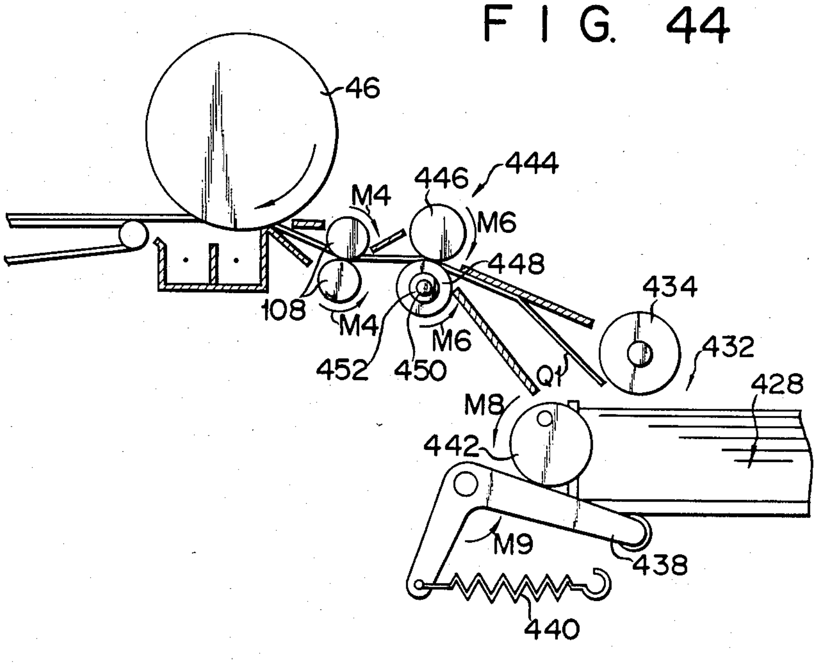

Subsequently, the pair of first resist rollers 108 are driven in synchronism with the copying process of the copying machine body 4. The uppermost copy sheet Q1 is fed toward the lower portion of the photosensitive drum 46, as shown in FIG. 44. In this state, the feeding roller 446 and the separating roller 448 are kept stopped. However, since the feeding force of the resist rollers 108 is stronger than the brake force of the rollers 446 and 448, the rollers 446 and 448 are rotated by the upon movement of the copy sheet. Therefore, the rollers 446 and 448 will not interfere feeding of the copy sheet.

The copy sheets can be separated one by one in accordance with the sequence described above, and sheet feeding can be performed in synchronism with the copying process.

When single sheet feeding is continuously repeated by a plurality of times, and a feeding interval is increased or decreased, the copy sheets are fed at a feeding pitch corresponding to the feeding interval. This can be achieved because the feeding speed of the copy sheet by means of the feeding roller 446 and the separating roller 448 is the same as the feeding speed by the resist rollers 108. Therefore, when the second feeding section 426 is used, the feeding pitch of the copy sheets can be arbitrarily set. For example, even if the time required for the copying process changes, the feeding pitch in synchronism with the copying process can be easily obtained. Therefore, when copying equipment incorporates the second feeding section 426, general-purpose copying equipment can be obtained.

"Feeding of Two Successive Sheets"

An operation will be described with reference to FIGS. 44 to 48, wherein the paper feed mode selection button 36 designates "feeding of two successive sheets."

When a command representing feeding of two successive sheets is supplied to the driving control unit 506, the motor 454 (shown in FIGS. 39 and 40) is driven and only the uppermost copy sheet Ql is fed to the lower portion of the photosensitive drum 46, in the same manner in the copying process described with reference to FIGS. 41 to 44.

During feeding of the copy sheet Ql, the regulating cam 442 is rotated by a half revolution in the direction of arrow M8 in FIG. 44. The pressing lever 438 is biased by the spring 440 upon pivotal movement of the cam 442 and is rotated in the direction of arrow M9 in FIG. 44. Therefore, the next copy sheet Q2 is brought into tight contact with the outer surface of the roller 434, as shown in FIG. 45.

Figure 45:
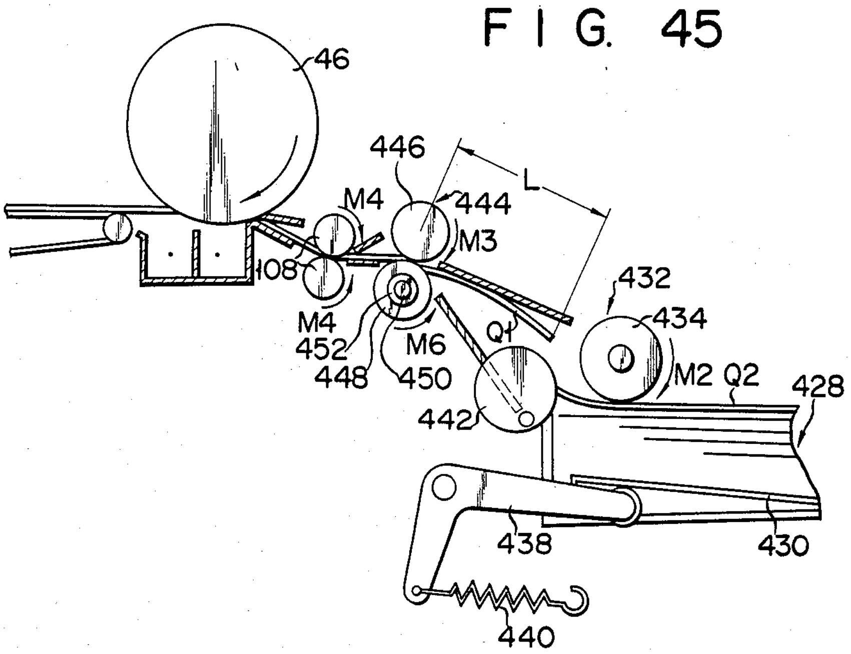

When the copy sheet is fed for a time until a distance between the trailing end of the copy sheet Q1 and the nip portions of the feeding and separating rollers 446 and 448 becomes L, the roller 434 is rotated in the direction of arrow M2 again, as shown in FIG. 45, so that the next copy sheet Q2 is fed forward. At the same time, the feeding roller 446 is rotated in the direction of arrow M3, and the separating roller 448 is rotated in the direction of arrow M6.

Figure 46:
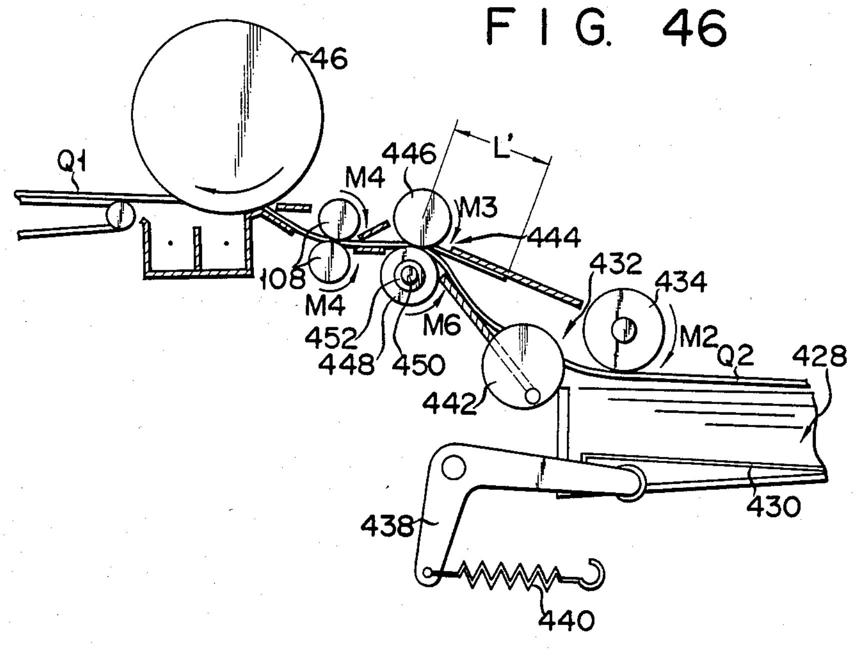

When the leading end of the copy sheet Q2 has reached the nip portions of the feeding roller 446 and the separating roller 448 while the copy sheets Q1 and Q2 are being fed, as shown in FIG. 46, the leading end of the copy sheet Q1 does not pass between the feeding roller 446 and the separating roller 448 for a length L'.

Figure 47:
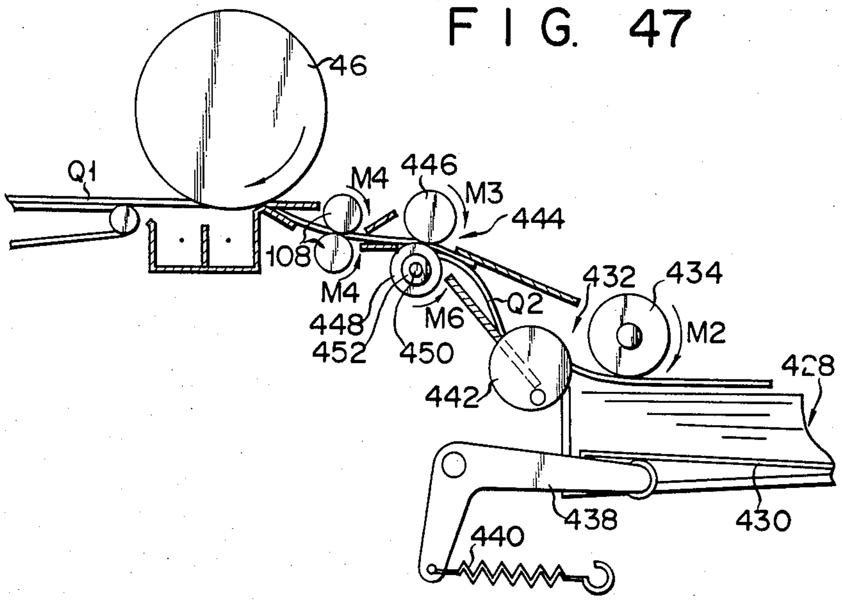

When a feeding speed of the copy sheets Q1 and Q2 is given as V it takes a period of time L'/V until the copy sheet Q1 completely passes through the nip portions of the feeding roller 446 and the separating roller 448 from the state shown in FIG. 46. During this period L'/V, the next copy sheet Q2 cannot pass through the feeding roller 446 and the separating roller 448 due to the operation of the limited power transmitting mechanism 452. At the same time, the forward feeding force of the roller 434 acts on the copy sheet Q2, so that the copy sheet Q2 cannot pass between the feeding roller 446 and the separating roller 448, and is aligned as warped at a location before the feeding roller 446 and the separating roller 448, as shown in FIG. 47.

Figure 48:
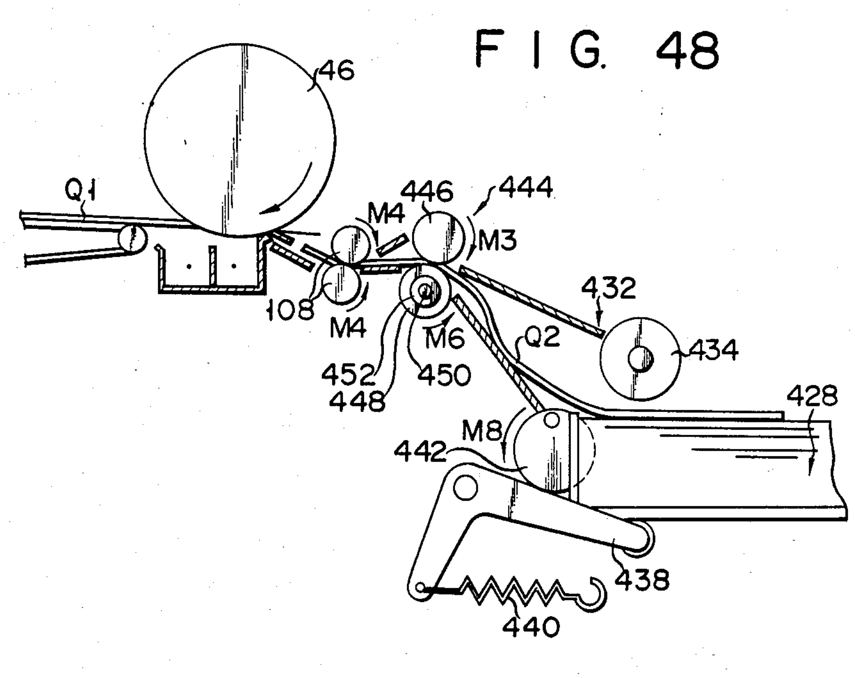

The feed-back force (acting through the limited power transmitting mechanism 452) acting on the copy sheet to be fed when the copy sheet Q1 passes through the feeding roller 446 and the separating roller 448 is released. As shown in FIG. 48, the copy sheet Q2 is fed continuously with the copy sheet Q1 at zero pitch between the feeding roller 446 and the separating roller 448. Since the feeding speed of the copy sheet Q by the pair of first resist rollers 108 is the same as that of the sheet by the feeding and separating rollers 446 and 448, the copy sheets Ql and Q2 are fed to the photosensitive drum 46 at the zero pitch. When the trailing end of the copy sheet Q2 is separated from the roller 434, the roller 434 is stopped, and the second feeding section 426 is set in the initial state shown in FIG. 41. The second feeding section 426 waits for an instruction from the driving control unit 506.

By the above sequence of copying operation, two succesive copy sheets can be continuously fed. This feeding operation is required when the two documents are placed on the document table glass 10 and are scanned once but are copied on the different sheets.

"Margin Formation"

Figure 49:
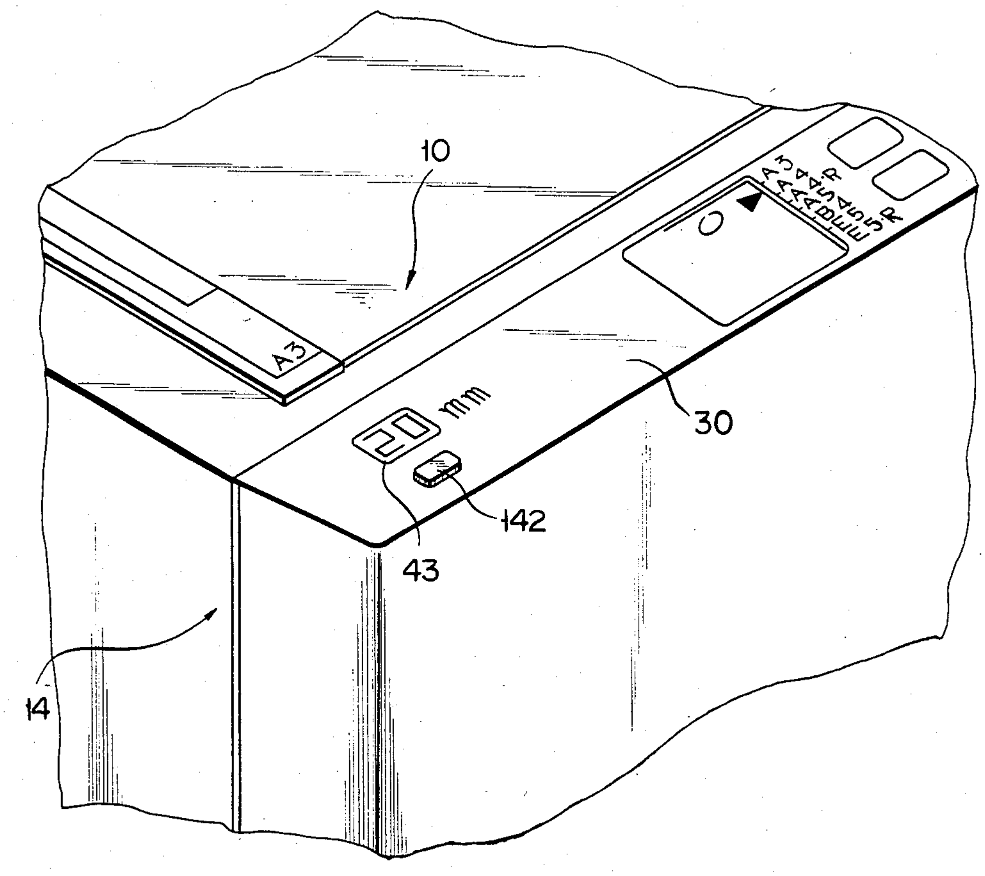
FIG. 49 is a perspective view showing part of an operation panel.
Figure 50:
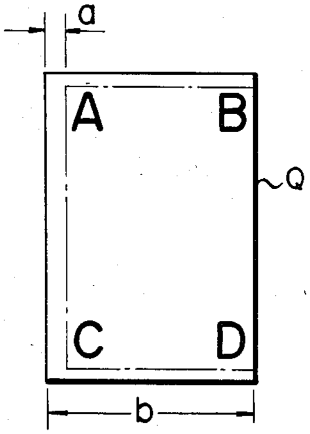
FIGS. 50 and 51 are respectively plan views of a sheet so as to explain formation of a margin portion of the sheet.
Figure 51:
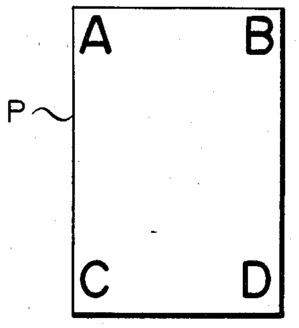

The formation of a margin (nonimage portion) will be described with reference to FIGS. 49 to 51.

A method of forming an image on a copy sheet with a given margin comprises the step of setting a margin size a (FIG. 50) to be formed on a recording medium (copy sheet Q) to be copied with a document image. Second, this method comprises: the exposure step of optically exposing a document image at a reduction ratio $m=\alpha(b-a)/b$ in accordance with the margin size a, the length b of the recording medium along the feeding direction, and a magnification $\alpha$; and the image charge carrying step for forming a latent image on the photosensitive drum. Third, the method comprises the recording medium feeding step for feeding the recording medium in synchronism with conveying of the latent image formed by image charge carrying step. Finally, the method comprises a visible image recording step of forming the visible image on the recording medium conveyed by the recording medium conveying step by offsetting the image by the margin size a from the feeding direction end of the recording medium.

The margin size setting step is performed by the margin size selection button 42 arranged in the operation panel 30. As shown in FIG. 49, the margin size is set as 5 mm, 10 mm, 15 mm, 20 mm and 25 mm from the distal end of the copy sheet along the feeding direction in accordance with the number of depressions of the button 42. The margin size set by the button 42 is digitally displayed in a margin display section 43, as shown in FIG. 49.

In this case, the exposure step is performed such that the exposing unit 58 including the mirror 52 and the lens 54 is moved to a predetermined position in accordane with the preset value of the margin size. For example, when the magnification data set by the magnification selection button 32 represents the equal size, the image of the document on the document table glass 10 is optically reduced at the reduction ratio $m=(b-a)/b$.

The reduced exposure image is formed as the latent image on the photosensitive drum 46, and the latent image is carried by the photosensitive drum 46. The latent image is then developed by the developing unit 64, thereby performing the charged image carrying step.

Latent image conveying is synchronized with feeding of the copy sheet from the first feeding section 424 or the second feeding section 426, thereby performing the recording medium feeding step. In this case, the copy sheet is fed by the margin size a ahead from the visible image.

When the visible image comes into contact with the copy sheet, the image is transferred by the transfer unit 66, so that the visible image is transferred to the copy sheet, thus completing the visible image recording step. In this visible image recording step, the image formed on the copy sheet Q is illustrated in FIG. 50. The document image shown in FIG. 51 is reduced with a reduction ratio m, and a reduced image is formed on the copy sheet such that the image is offset by the margin size a from one end (leading end of the sheet along the feeding direction) of the copy sheet.

In margin formation, the feeding timing of the copy sheet advances with respect to the conveying timing of the visible image in the visible image recording step so as to guarantee the margin size a. However, margin formation is not limited to this method. For example, the photosensitive drum 46 may be exposed at a delay time corresponding to the margin size a with respect to the convey operation of the latent image.

By forming the image with a margin in accordance with the above method, a desired margin can be formed on the copy sheet. In addition, the desired image will not be cut off.

"Two-Side Copy"

Automatic two-side copying will be described with reference to FIGS. 52 to 61.

When the number of documents P is an odd number, a copy sheet which is not subjected to image recording is fed before a copy sheet having an image on one surface is subjected to image recording on the other surface. The copy sheets fed in this step include a copy sheet which will have an image of the final odd-numbered document P. In this case, assume that a maximum of two documents are fed in a continuous manner.

When the document size selection button 45 on the operation panel 30 is operated, a discrimination control unit (not shown) discriminates that the length of the two documents along the feeding direction falls within the effective exposure range on the document table glass 10. If the two documents can be set, a two-sheet feeding signal is generated when, for example, the document P has the B5 size. However, when the length of the two documents does not fall within the effective exposure range (e.g., when the document P has the A3 size), an indicator (not shown) arranged in the vicinity of the copy mode selection button 34 flashes. In this case, the two-side copy mode is not selected, and this indicator is kept off. However, when the two-side copy mode is selected, the indicator is turned on, so that the operator can know that the two-side copy mode is set. The copying machine will not receive the copy start signal from the start button 38. When the discrimination control unit detects that the two-sheet continuous feeding mode is set, and the two-side copy mode is selected, the indicator (not shown) is turned on, so that the operator knows that the two-side copy mode ready state is set. In this case, it is very important to detect in the two-side copy mode whether the number of documents is an odd or even number. When the operator operates the odd-number input button 40 and the control unit detects that the number of documents is an odd number, the image on the final document P is formed on the sheet in the single side copy mode. When an odd number of documents is set by the odd-number input button 40, an image formation instruction is generated for the rear document (i.e., the second document) placed on the document table glass 10 (in this case, the position of the second document is called a second exposure position S2 in FIG. 52). However, when the odd-number input button 40 is not operated, the control unit detects that the number of documents is an even number, and the image forming instruction is generated for the front document (i.e., the first document) placed on the document table glass 10 (in this case, the position of the first document is called a first exposure position S1).

Figure 52:
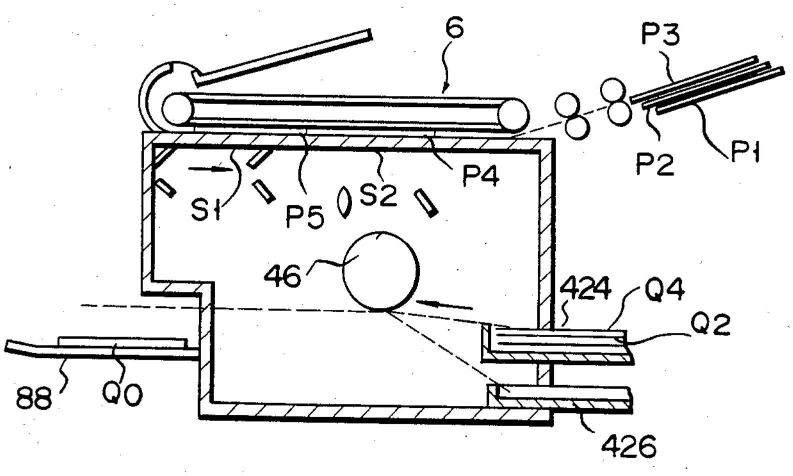
FIGS. 52 to 57 are respectively sectional views for explaining the operation when an odd number of documents are copied on two surfaces of the sheets in a continuous page order.
Figure 53:
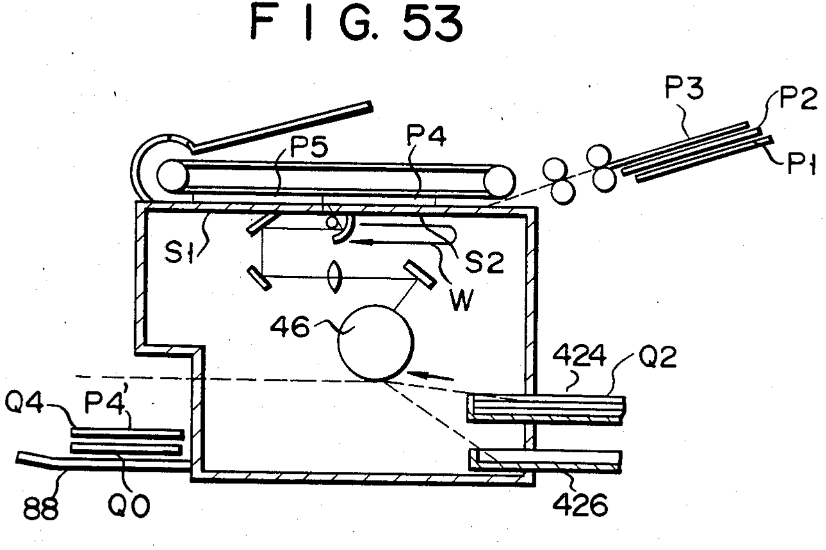

An operation will be exemplified wherein a document size is A4, the number of documents is an odd number, the magnification is the equal size, and the copying mode is the two-side copy mode. First, as shown in FIG. 52, the operator inserts the odd number of documents in the chamber 24 at once (document stacking step). The documents urge a detection lever 156 (indicated by the alternate long and short dashed line in FIG. 6) of the document detection mechanism 158 so as to cause a detector (not shown) to detect the documents. A document feeding ready lamp (not shown) is then turned on. A size selection button (not shown) is operated to select the A4 size, and the selected paper size is indicated. The control unit detects the document size (length). However, when the size selection button 45 is not selected, the "A4" size is detected by a document size detector (not shown), and the same operation as described above is performed. When the document feeding number is entered as "two continuous sheets"), the control unit compares the effective exposure range of the exposing lamp 4 with the length of the two documents along its feeding direction. If the length of the two documents falls within the exposure range, the control unit supplies a "two-sheet continuous feeding" instruction to the separating/feeding unit 110. The separation operation distance represented by this instruction is, for example, 3/2 (1.5 sheets)×A4 size length (210 mm)=315 mm. In other words, the control unit causes the separating roller of the document feeding unit 8 to feed the document P by about 315 mm.

When the copy mode button 34 is operated by the operator to select the two-side copy mode, and the odd-number input button 40 is operated, the image forming instruction is generated for the copy sheet located in the second exposure position S2. Furthermore, when the margin size is set by the margin size selection button 42 and the margin display unit 43 to, e.g., 20 mm, the positions of the lens 54 and the mirror 52 are controlled such that the reduction ratio m becomes $(210-20)/210 \approx 0.9$ for the 210 mm length of the A4 document. The copy sheet is fed by 20 mm ahead of the latent image formed on the photosensitive drum 46. In other words, when the transfer speed of the photosensitive drum 46 is given as V, the start timing of the copy sheet Q is advanced by 20/V. When the start button 38 is depressed, the first motor 160 of the document feeding unit 8 is rotated, and the two documents are fed and located at the predetermined exposure positions Sl and S2 on the document table glass 10 in such a manner that the documents are counted down from the final page (first document feeding step). The separating rollers 118 and 120 and the rollers 124 and 126 are rotated to feed the two documents P5 and P4 to the conveyor belt unit 6 in a continuous manner. These two documents are stopped at the predetermined exposure positions Sl and S2 on the document table glass 10, as shown in FIG. 52. The leading end of the front document P5 is stopped at the first exposure position S1, and the leading end of the rear document P5 is stopped at the second exposure position S2. In this embodiment, the total number of documents is five. The documents are fed from the last page. The documents P5, P4, . . . , and P1 represent the fifth, fourth, . . . , and first pages, respectively.

Before the documents P5 and P4 stopped at the predetermined positions are exposed, the first copy sheet Q0 is fed out from the first feeding unit. This copy sheet P0 is not subjected to image formation and is discharged in the discharging tray 88 (single sheet feeding step). Subsequently, the document P4 located in the second exposure position S2 is exposed by the exposing unit 58 (first scanning step), and an image P4′ of the document P4 located in the second exposure position S2 is formed through the photosensitive drum 46 on the copy sheet Q4 fed from the first feeding section 424 in the direction, indicated by arrow W (first image forming step). The copy sheets each having the image on one surface are sequentially discharged in the tray 88 and are stacked (stacking step).

Figure 54:
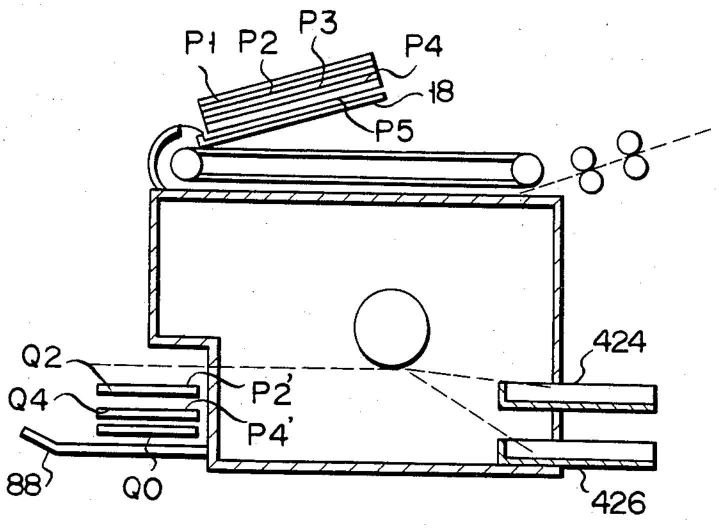

When image formation of only the document P4 is completed, the two documents P5 and P4 are discharged in the document tray 88 and are stacked. In this manner, the two documents are fed at once, and the image is formed on the document (i.e., even-numbered documents P4 and P2) located in the second exposure position. As shown in FIG. 54, the blank copy sheet Q0, the copy sheet Q4 having the image P4′ of the document P4, and the copy sheet Q2 having the image P2′ of the document P2 are sequentially stacked in the copy sheet discharging tray 88. The documents P1, P2, P3, P4 and P5 are stacked in the document tray 88 in the order such that the final page document P5 is located at the lowest position.

Figure 55:
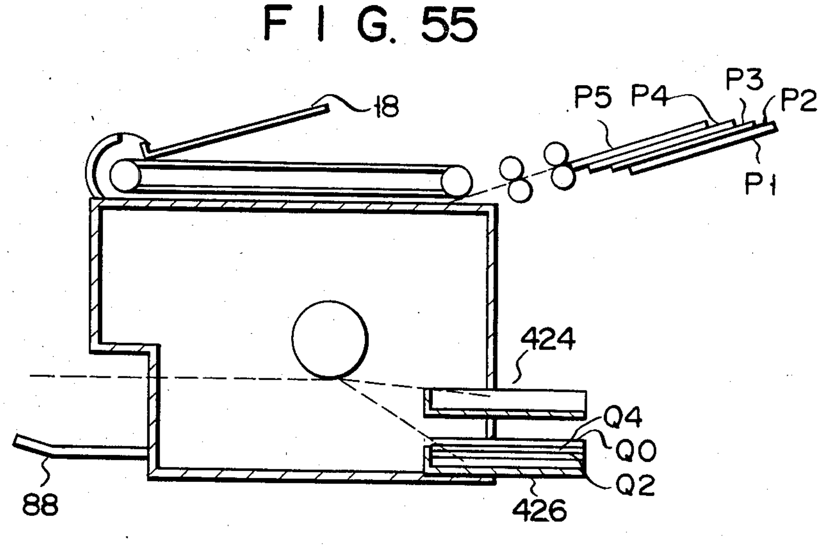

The copy sheets Q0, Q2, Q4 discharged as shown in FIG. 55 are turned over and are set in the second feeding section 426. The copy sheets are sorted from the top in an order of Q0, Q2 and Q4. On the other hand, the documents are also stacked from the bottom in an order of P1, P2, P3, P4 and P5 and are stacked in the document feeding unit 8.

Figure 56:
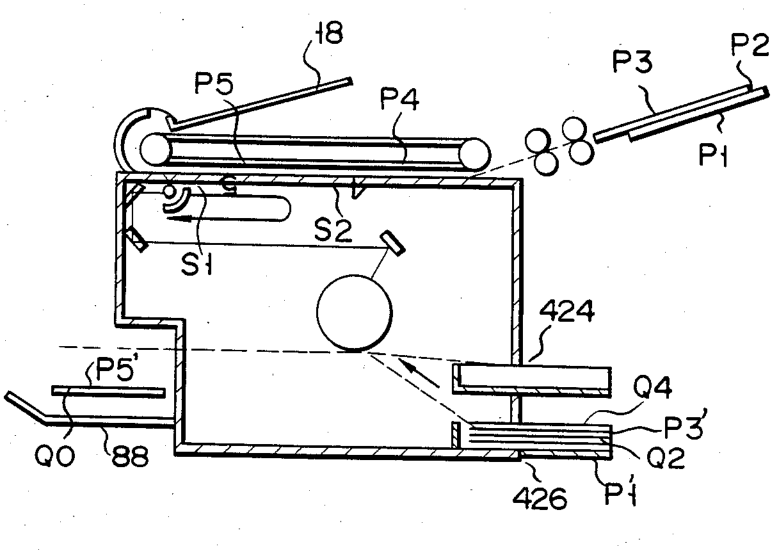
Figure 57:
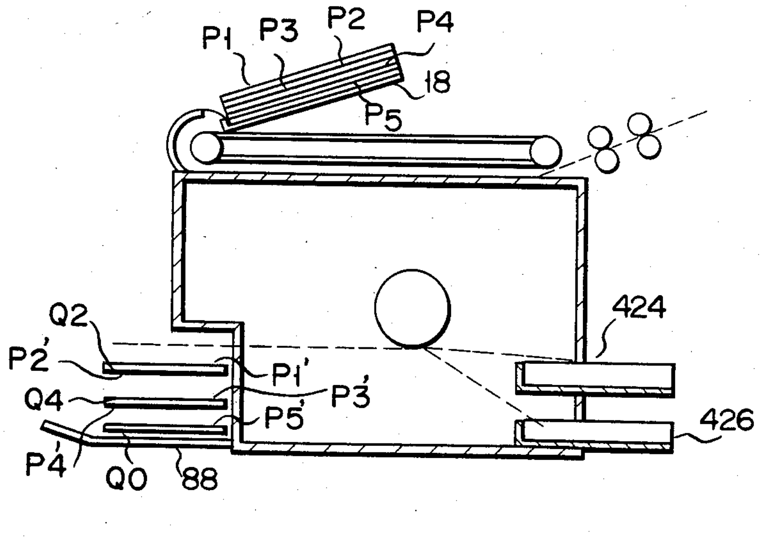

When the start button 38 is depressed, the two documents P5 and P4 are guided to the predetermined exposure positions (second document feeding step) in the order named, as shown in FIG. 56. In this case, the document P5 located in the first exposure position S1 is subjected to image formation. On the other hand, the copy sheets are sequentially fed from the second feeding section 426 (second sheet feeding step). The image P5′ of the document P5 is formed on the upper surface of the copy sheet Q0. In the same manner as described, the documents P3 and P2 is subjected to image formation, and the image P3′ of the document P3 is formed on the upper surface of the copy sheet Q4. The image P1′ of the document P1 is formed on the upper surface of the copy sheet Q2 (second image forming step).

In this manner, when a series of copying operations is completed, the copy sheet Q0 having the image P5′ of the document P5 on its upper surface, the copy sheet Q4 having the image P4 of the document P4 on its upper surface and the image P3′ of the document P3 on its lower surface, and the copy sheet Q2 having the image P2′ of the document P2 on its lower surface and the image P1′ of the document P1 on its upper surface are discharged in the discharging tray 88 in an order of Q0, Q4 and Q2 from the bottom. Therefore, the two-side copy operation can be performed even if the number of documents is an odd number. In addition, the copied sheets can be stapled or the like in the copied state without sorting.

When the number of documents is an even number, the odd-number input button 40 is not operated. The document (e.g., P4 among the two documents P4 and P3) located in the first exposure position S1 is subjected to image formation to form an image on one surface of the copy sheet Q2. Subsequently, the image of the document (i.e., the document P3 among the documents P4 and P3) located in the second exposure position S2 is formed on the copy sheet Q, thereby obtaining the two side copied sheets whose pages are the same as the pages of the documents. The two documents are guided to the image formation positions before the image formation is performed, and one of these two documents is subjected to image formation. Thereafter, these two sheets are discharged, and the image is formed on the other surface of the copy sheet, so that the documents need not be sorted after copying, thus shortening the copying time. As a result, the two-side copy mode can be effectively performed.

Figure 58:
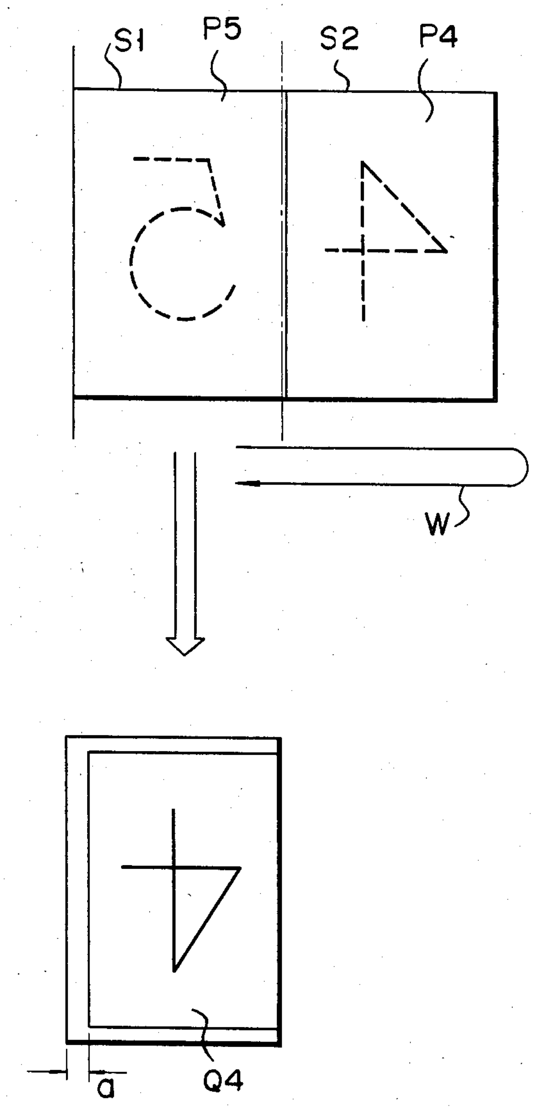
FIGS. 58 to 61 are respectively plan views for explaining patterns copied on the two surfaces of the sheet when the number of documents is an odd number.
Figure 59:
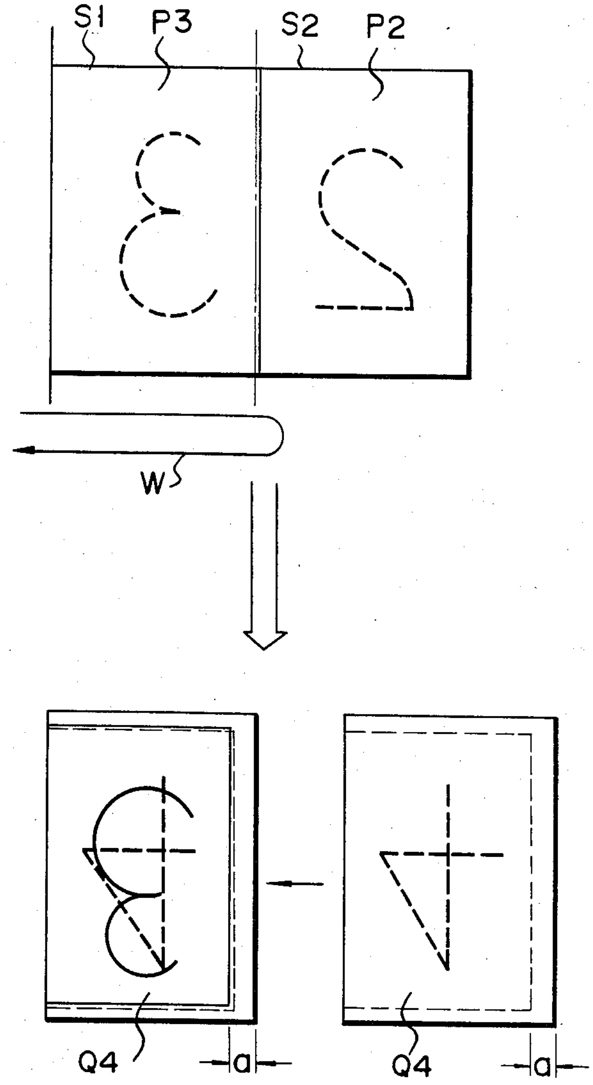

The copying state as described above will be described with reference to the pattern shown in FIGS. 58 to 61. In the series of copying operations for the document at the second exposure position S2, for the documents P4 and P5 placed on the glass having image surfaces facing downward as shown in FIG. 58, the image corresponding to the document P4 at the second exposure position S2 is formed on the copy sheet Q4. Note that the margin a is located at the leading side along the convey direction. In the next series of the copy operations for the document at the first exposure position S1, for the documents P3 and P2 placed on the glass having image surfaces facing downward as shown in FIG. 59, and image P3′ of the document P3 is formed on the other surface of the copy sheet Q4 on one surface of which the image P4′ of the document P4 has been formed. In this manner, images are formed on the two sides of the copy sheet Q4. The margin a is set in the trailing side (right side in the figure) of the copy sheet Q4 along the convey direction.

When the above operation is preformed continuously, a document counter 378 (FIG. 6) counts the number of documents supplied through the document outlet port (conveyor belt unit 6 side) of the document feeding unit 8. When two documents are continuously fed, the counter 378 is set in the wait mode after counting an even number of documents, and starts counting the documents supplied next. However, when an odd number of documents are set on the document feeding unit 8, only a single document is fed last. For example, when five documents are placed on the unit 8, only the document of the first page is fed last. In this case, the counter 378 holds an odd count even after a time required for two documents to be fed has elapsed. The last document (e.g. page 1) is detected by a document detecting mechanism 158.

Figure 60:
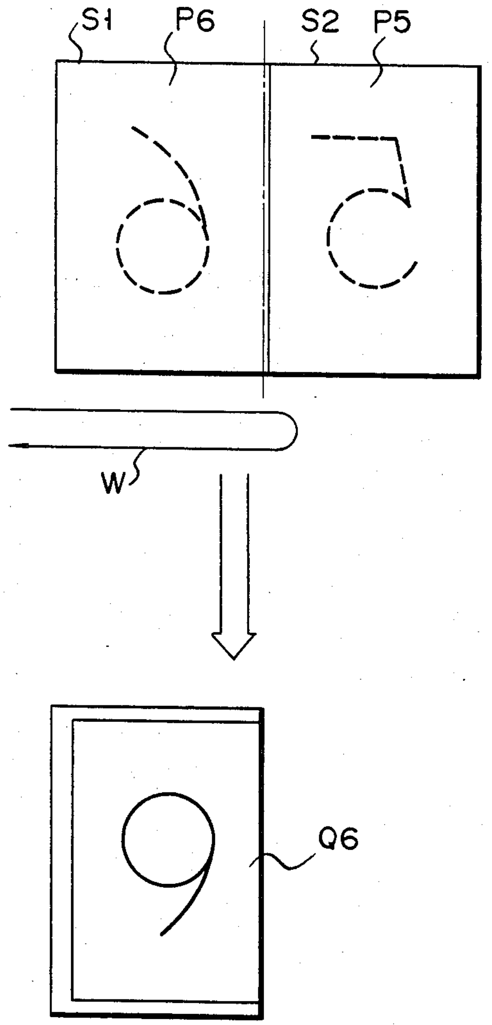
Figure 61:
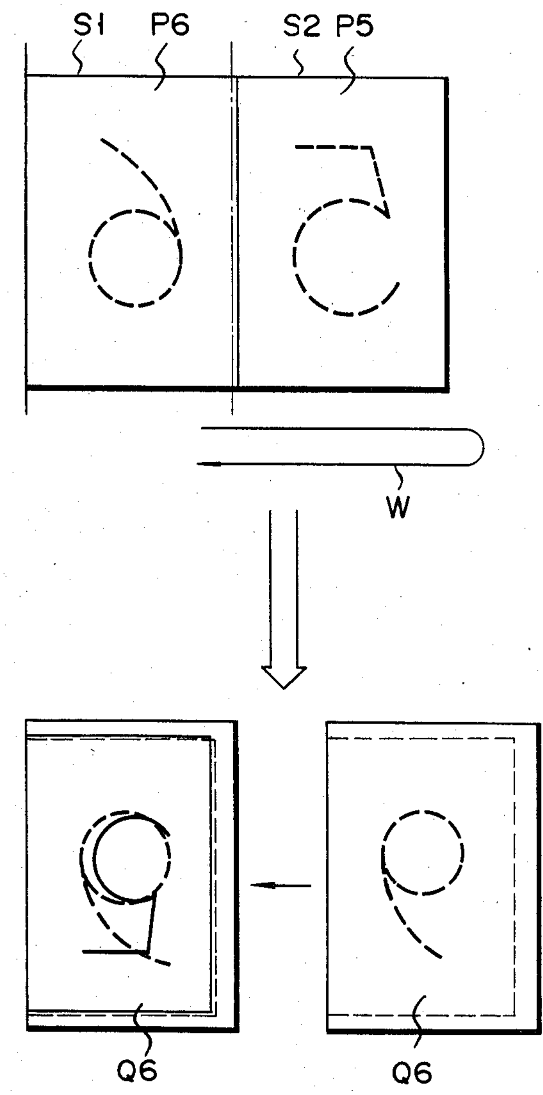

The single sheet supply step for supplying single copy sheets Q is performed before images of respective documents P are formed on one surface of each copy sheet Q. However, the present invention is not limited to this. For example, after images of documents are formed on one surface of each copy sheet, the copy sheets are set on the paper feed section after a new copy sheet Q0 is set on them. Alternatively, the copy sheet Q0 is not fed in the state shown in FIG. 52, but is fed from the first paper feeding section 424 before the state shown in FIG. 55 is achieved. In this case, as shown in FIG. 60, in the first copying operation for the documents P6 and P5 placed on the exposing glass having the image surface facing downward as shown in FIG. 60, an image P6′ corresponding to the document P6 (a number 6 indicated by the solid line in the lower figure in FIG. 60) is formed on the copy sheet Q6. The margin a is located at the leading side (left in the figure) along the convey direction. In the next copy operation for the document corresponding to the second exposing position P2, for the documents P5 and P6 placed on the document glass having the image surfaces facing downward as shown in FIG. 61, an image P5′ (a number 5 indicated by the solid line in the lower figure) is formed on the other surfaces of the copy sheet Q6 on one surface of which the image P6′ (the number 6 indicated by the dotted line in the lower figure) is formed. In this manner, image of the numbers 5 and 6 are formed on the two surfaces of the single copy sheet Q6. The margin a is formed at the trailing side (right in FIG. 61) of the copy sheet Q6 along the convey direction.

"Continuous Document Feed"

A case wherein documents are fed continuously with the automatic two-side copying machine will be described with reference to FIGS. 62 to 65.

The document feed mode selection button 44 and the start button 38 of the operation panel 30 (FIG. 4) are depressed. Then, the first motor 160 (FIG. 5) is driven. In the same manner as that described with reference to FIGS. 18 and 22, only the uppermost document is conveyed by the separating rollers 118 and 120. The leading end of the document is brought into contact with the nip portions of resist rollers 124 and 126.

Next, at the timing of the image formation processing by the copying machine main body 4, the first and second motors are simultaneously driven. The conveyor belt 12 is then driven to convey the document to an exposure position on the exposure table 10. At this time, since the separating roller 118 is being driven, when the trailing end of the first document passes between the nip portions of the separating rollers 118 and 120, the next document starts to be fed by the separating rollers 118 and 120. This is because the counter force which has been acting on the next document through the separating roller 118 is cancelled when the first document is conveyed. For this reason, the first and second documents are conveyed continuously. Since the convey speed of the document by the rollers 124 and 126 and the convey speed thereof by the convey belt 12 are set to be the same, the convey pitch of the first and second documents will not change during the convey operation thereof. In this manner, both the documents are continuously conveyed. The convey time of the first document by the convey belt 12 is predetermined in association with the convey path and the convey speed to the exposure position. When this predetermined time has elapsed, the first and second motors are stopped. Then, the first document stops at the exposure position, and the next document stops next to the first document. The first document which has stopped at the exposure position is exposed in the image formation process by the copying machine main body 4 at a predetermined timing.

After the exposing operation of the first document is completed, the first and second motors are driven at the copy process timing of the next document so as to reproduce a copy of the next document. Then, the first document is discharged, and the next document is fed to the exposure position. A still next document is also continuously fed next to the second document in the same manner as described above. For this purpose, the drive time of the first and second motors is determined to allow a predetermined convey time of the documents along the convey direction. This drive time is controlled by a discrimination control section (not shown) in accordance with a document size detected by an optical detecting means (not shown). When documents fed next to each other are fed for a distance corresponding to the length of a single document (along the convey direction), the next document can be stopped at the exposure position. When such a convey operation is repeated, the feed/discharge operation of the documents to and from the exposure position can be quite efficiently performed.

In this case, the moving range of the exposing unit, i.e., the operation range thereof may cover two documents P1 and P2. In this case, a copy sheet (having a size corresponding to the sum of lengths of the documents P1 and P2) is supplied, and the images of the two documents are reproduced on the single copy sheet. In this case, a still more efficient copying operation can be performed.

Figure 62:
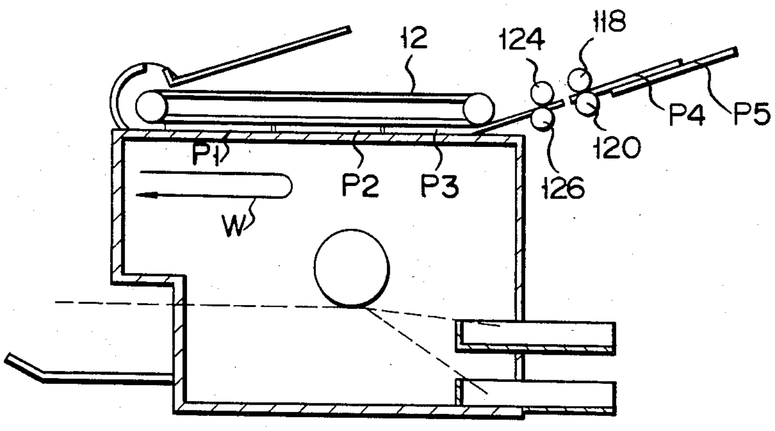
FIGS. 62 to 65 are respectively side views schematically showing the copying machine when the number of documents are fed continuously.
Figure 63:
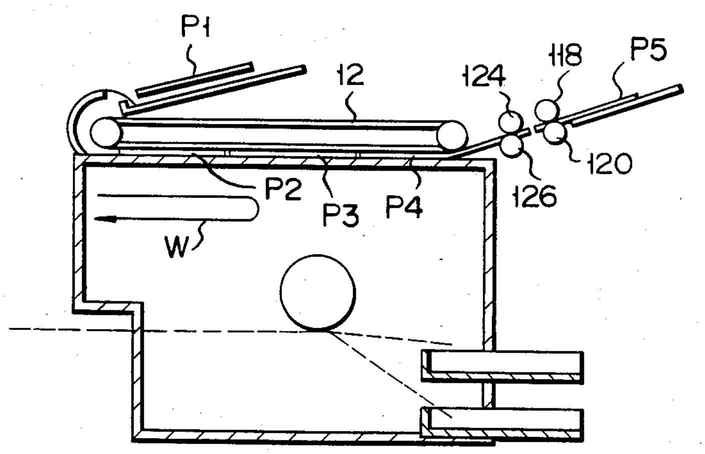

As shown in FIG. 62, documents P1, P2 and P3 are fed continuously until the leading end of the first document reaches the exposure position. When the image formation processing of the document P1 is completed, the document P1 is discharged and documents P2, P3 and P4 are fed until the leading end of the document P2 reaches the exposure position, as shown in FIG. 63. In this manner, this operation is repeated to complete image formation operations of all the documents.

Figure 64:
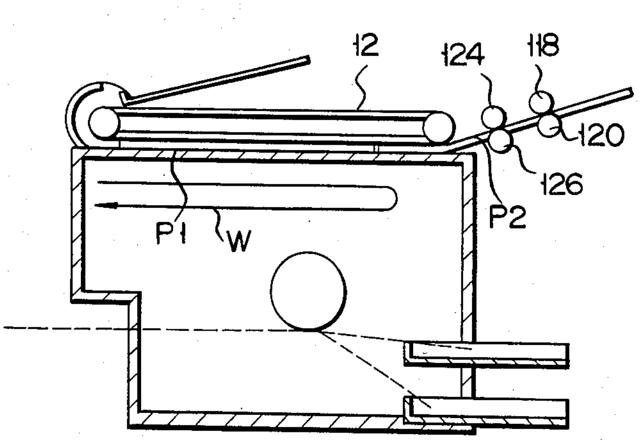
Figure 65:
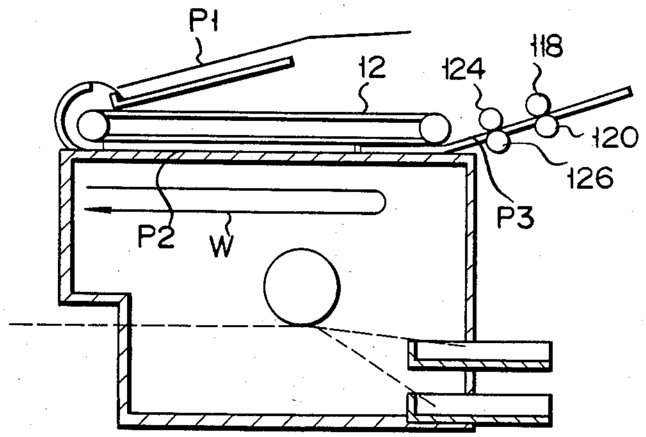

In a similar manner, as shown in FIGS. 64 and 65, when the size of the document P1 is large, i.e., when only a single document can be placed on the exposing table 10, documents can also be supplied continuously.

In FIGS. 62 to 65, a U-turn arrow W indicates the exposing range.

According to the embodiment of the present invention, when images of an odd number of documents are formed on two sides of a recording medium, the images can be formed in a sequential order of pages on the recording medium.

When the two-side copy is completed and the copy sheets are stapled in a book-like form, the image of the first page of the first document can be formed at the first page (front cover).

The present invention is not limited to the particular embodiments described above, and various changes and modifications may be made with reference to the accompanying drawings. For example, the method of the present invention is not limited to an automatic two-side copying machine described above and can be applied to other types of image formation appartuses.

In the embodiment described above, when a single sheet is fed and when an image is formed on one surface of each sheet, an image is not formed on the first sheet. However, the present invention is not limited to this. That is, after an image is formed on one surface of each sheet, a new sheet of paper may be added to the stack of such sheets with images formed on one surface thereof before they are conveyed for forming images on the other surface thereof.

What is claimed is:

1. A method of forming images of respective documents on two surfaces of sheets in accordance with a page order of an odd numder of documents by using image forming apparatus having image forming means for forming the images in accordance with image patterns of the documents scanned at a scanning position, comprising:

a first document feeding step for repeatedly feeding two of the documents in reverse page order from a final page to the scanning position so that two documents are located at the scanning position;

a first scanning step for scanning one of said two documents located at the scanning position so that every second page beginning with the document which corresponds to a second page fed from the first document feeding step is scanned, thus scanning only alternate pages;

a first sheet feeding step for sequentially feeding a plurality of sheets to said image forming means, one sheet being fed for each document scanned in said first scanning step;

a first image forming step for forming each of the document images scanned by the first scanning step on one surface of each of the sheets fed in said first sheet feeding step;

a stacking step for stacking the sheets obtained in the first image forming step each of which has an image on one surface;

a second sheet feeding step for feeding the stacked sheets one by one to the image forming position, the second sheet feeding step being performed such that the sheets are fed in the same order as they were stacked in the stacking step;

a single sheet feeding step for feeding a non-used sheet to said image forming means before the second sheet feeding step is performed;

a second document feeding step for sequentially feeding the documents in reverse page order from the final page to the scanning position;

a second scanning step for scanning every second document from and including the final page which are fed from the second document feeding step; and a second image forming step for forming each of the images scanned in the second scanning step on the other surface of each of the sheets.

2. A method according to claim 1, wherein the single sheet feeding step is performed before the first sheet feeding step, and the first image forming step is performed such that the image is not formed on the first sheet but from the second sheet.

3. A method according to claim 1, wherein the first document feeding step comprises an uppermost document feeding step for sequentially feeding the documents from an uppermost document corresponding to the final document.

4. A method according to claim 1, wherein said method further comprises an upside down step for turning the stacked sheets upside down after the stacking step, and the second sheet feeding step is performed to sequentially feed from the uppermost sheet of the stacked sheets which are turned upside down.

5. A method according to claim 1, wherein the first document feeding step comprises a detecting step for detecting an absence of documents and generating a detection signal, and the second scanning step is performed such that the other of the two documents set in the scanning positions is scanned in accordance with the detection signal.

6. A method according to claim 1, wherein the first document feeding step comprises a continuous feeding step for cntinuously feeding the documents.

7. A method according to claim 1, wherein the first and second document feeding steps comprise a document separating step for properly separating the documents one by one and feeding each document.

8. A method according to claim 1, wherein the second sheet feeding step comprises a sheet separating step for properly separating the sheets one by one and feeding each sheet.

9. A method according to claim 1, wherein the image forming step comprises a margin forming step for forming a margin for a gutter at one side of each sheet when the images are formed on the sheets.

10. A method according to claim 9, wherein the margin forming step comprises an image reduction step for reducing the image in accordance with a margin size.

11. A method according to claim 10, wherein the margin forming step comprises a timing delay step for delaying an image forming timing for the sheet fed to said image forming step.

* * * * *